US007664097B2

(12) United States Patent
White et al.

(10) Patent No.: US 7,664,097 B2
(45) Date of Patent: Feb. 16, 2010

(54) TELEPHONE SERVICE VIA NETWORKING

(75) Inventors: Patrick E. White, Vienna, VA (US);
Robert D. Farris, Sterling, VA (US)

(73) Assignee: Verizon Services Corp., Arlington, VA (US)

( * ) Notice: Subject to any disclaimer, the term of this patent is extended or adjusted under 35 U.S.C. 154(b) by 791 days.

(21) Appl. No.: 10/807,215

(22) Filed: Mar. 22, 2004

(65) Prior Publication Data

US 2004/0174880 A1 Sep. 9, 2004

Related U.S. Application Data

(63) Continuation of application No. 09/441,565, filed on Nov. 17, 1999, now Pat. No. 6,711,241, which is a continuation of application No. 08/670,908, filed on Jun. 26, 1996, now Pat. No. 6,069,890.

(51) Int. Cl.
*H04L 12/66* (2006.01)
(52) U.S. Cl. .................. 370/352; 370/353; 370/354; 370/355; 370/356
(58) Field of Classification Search ................. 370/351, 370/352, 356, 242, 248, 249, 353, 354, 355, 370/357, 395.2, 395.21, 259; 379/88.11, 379/90.01, 100, 219, 220.1, 221.02, 221.14, 379/900
See application file for complete search history.

(56) References Cited

U.S. PATENT DOCUMENTS

| | | | |
|---|---|---|---|
| 4,054,756 A | 10/1977 | Comella et al. | |
| 4,100,377 A | 7/1978 | Flanagan | |
| 4,191,860 A | 3/1980 | Weber | |
| 4,201,891 A | 5/1980 | Lawrence et al. | |
| 4,310,727 A | 1/1982 | Lawser | |
| 4,313,035 A | 1/1982 | Jordan et al. | |
| 4,313,036 A | 1/1982 | Jabara et al. | |
| 4,371,752 A | 2/1983 | Matthews et al. | |
| 4,375,097 A | 2/1983 | Ulug | |
| 4,555,594 A | 11/1985 | Friedes et al. | |

(Continued)

FOREIGN PATENT DOCUMENTS

EP 0235257 9/1987
EP 0335562 4/1989

(Continued)

OTHER PUBLICATIONS

U.S. Appl. No. 60/023,891, filed Aug. 16, 1996.

(Continued)

*Primary Examiner*—Aung S Moe
*Assistant Examiner*—Abdullah Riyami

(57) ABSTRACT

A system and method for providing telephone type services over an Internet Protocol (IP) network, such as the internetwork commonly known as the Internet. In preferred embodiments, public switched telephone networks utilizing program controlled switching systems are arranged in an architecture with the Internet to provide a methodology for facilitating telephone use of the Internet by customers on an impromptu basis. Provision is made to permit a caller to setup and carry out a telephone call over the Internet from telephone station to telephone station. Calls may be made on an inter or intra LATA, region or state, nationwide or worldwide basis. Billing may be implemented on a per call, timed, time and distance or other basis. Calls may be made front telephone station to telephone station, from telephone station to computer or computer to telephone station.

21 Claims, 9 Drawing Sheets

U.S. PATENT DOCUMENTS

| | | | |
|---|---|---|---|
| 4,565,903 A | 1/1986 | Riley | |
| 4,577,066 A | 3/1986 | Bimonte et al. | |
| 4,585,906 A | 4/1986 | Matthews et al. | |
| 4,602,129 A | 7/1986 | Matthews et al. | |
| 4,609,778 A | 9/1986 | Franklin et al. | |
| 4,611,094 A | 9/1986 | Asmuth et al. | |
| 4,611,096 A | 9/1986 | Asmuth et al. | |
| 4,625,081 A | 11/1986 | Lotito et al. | |
| 4,630,262 A | 12/1986 | Callens et al. | |
| 4,652,700 A | 3/1987 | Matthews et al. | |
| 4,653,045 A | 3/1987 | Stanley et al. | |
| 4,672,700 A | 6/1987 | Poncy | |
| 4,679,190 A | 7/1987 | Dias et al. | |
| 4,685,125 A | 8/1987 | Zave | |
| 4,710,917 A | 12/1987 | Tompkins et al. | |
| 4,713,806 A | 12/1987 | Oberlander et al. | |
| 4,718,005 A | 1/1988 | Feigenbaum et al. | |
| 4,730,071 A | 3/1988 | Schoenthal | |
| 4,734,931 A | 3/1988 | Bourg et al. | |
| 4,741,820 A | 5/1988 | Coughlin | |
| 4,747,130 A | 5/1988 | Ho | |
| 4,748,618 A | 5/1988 | Brown et al. | |
| 4,765,924 A | 8/1988 | Inoue | |
| 4,766,604 A | 8/1988 | Axberg | |
| 4,771,425 A | 9/1988 | Baran et al. | |
| 4,782,485 A | 11/1988 | Gollub | |
| 4,788,718 A | 11/1988 | McNabb et al. | |
| 4,790,003 A | 12/1988 | Kepley | |
| 4,821,034 A | 4/1989 | Anderson et al. | |
| 4,827,500 A | 5/1989 | Binkerd et al. | |
| 4,865,763 A | 9/1989 | Inoue | |
| 4,866,763 A | 9/1989 | Cooper et al. | |
| 4,872,157 A | 10/1989 | Hemmady et al. | |
| 4,872,160 A | 10/1989 | Hemmady et al. | |
| 4,872,197 A | 10/1989 | Pemmaraju | |
| 4,875,206 A | 10/1989 | Nichols et al. | |
| 4,877,949 A | 10/1989 | Danielson | |
| 4,882,476 A | 11/1989 | White | |
| 4,893,302 A | 1/1990 | Hemmady et al. | |
| 4,894,824 A | 1/1990 | Hemmady et al. | |
| 4,897,874 A | 1/1990 | Lidinsky et al. | |
| 4,899,333 A | 2/1990 | Roediger | |
| 4,899,373 A | 2/1990 | Lee et al. | |
| 4,910,794 A | 3/1990 | Mahany | |
| 4,916,691 A | 4/1990 | Goodman | |
| 4,918,722 A | 4/1990 | Duehren et al. | |
| 4,922,348 A | 5/1990 | Gillon et al. | |
| 4,922,486 A | 5/1990 | Lidinsky et al. | |
| 4,933,931 A | 6/1990 | Kokubo | |
| 4,942,574 A | 7/1990 | Zelle | |
| 4,958,341 A | 9/1990 | Hemmady et al. | |
| 4,969,184 A | 11/1990 | Gordon et al. | |
| 4,979,206 A | 12/1990 | Padden et al. | |
| 4,996,707 A | 2/1991 | O'Malley et al. | |
| D315,573 S | 3/1991 | Schultz | |
| 5,008,906 A | 4/1991 | Reichwein | |
| 5,008,926 A | 4/1991 | Misholi | |
| 5,009,337 A | 4/1991 | Bimbi | |
| 5,012,511 A | 4/1991 | Hanle et al. | |
| 5,018,191 A | 5/1991 | Catron et al. | |
| 5,019,699 A | 5/1991 | Koenck | |
| 5,023,868 A | 6/1991 | Davidson | |
| 5,025,254 A | 6/1991 | Hess | |
| 5,029,196 A | 7/1991 | Morganstein | |
| 5,029,199 A | 7/1991 | Jones et al. | |
| 5,029,200 A | 7/1991 | Haas | |
| 5,031,098 A | 7/1991 | Miller | |
| 5,034,975 A | 7/1991 | Grimes | |
| 5,052,020 A | 9/1991 | Koenck | |
| 5,052,943 A | 10/1991 | Davis | |
| 5,065,393 A | 11/1991 | Sibbitt et al. | |
| 5,068,888 A | 11/1991 | Scherk et al. | |
| 5,070,536 A | 12/1991 | Mahany | |
| 5,098,877 A | 3/1992 | Coughlin | |
| 5,107,492 A | 4/1992 | Roux et al. | |
| 5,113,499 A | 5/1992 | Ankney et al. | |
| 5,115,431 A | 5/1992 | Williams et al. | |
| 5,115,495 A | 5/1992 | Tsuchiya et al. | |
| 5,123,064 A | 6/1992 | Hacker | |
| 5,134,647 A | 7/1992 | Pugh et al. | |
| 5,144,282 A | 9/1992 | Sutterlin | |
| 5,146,488 A | 9/1992 | Okada et al. | |
| 5,146,491 A | 9/1992 | Silver et al. | |
| 5,157,390 A | 10/1992 | Yoshie et al. | |
| 5,157,662 A | 10/1992 | Tadamura et al. | |
| 5,159,592 A | 10/1992 | Perkins | |
| 5,159,624 A | 10/1992 | Makita | |
| 5,163,080 A | 11/1992 | Amoroso | |
| 5,164,938 A | 11/1992 | Jurkevich et al. | |
| 5,180,232 A | 1/1993 | Chadima | |
| 5,185,860 A | 2/1993 | Wu | |
| 5,193,110 A | 3/1993 | Jones et al. | |
| 5,195,085 A | 3/1993 | Bertsch et al. | |
| 5,195,086 A | 3/1993 | Baumgartner et al. | |
| 5,195,128 A | 3/1993 | Knitl | |
| 5,195,183 A | 3/1993 | Miller | |
| 5,199,062 A | 3/1993 | Von Meister | |
| 5,200,993 A | 4/1993 | Wheeler et al. | |
| 5,202,817 A | 4/1993 | Koenck | |
| 5,202,825 A | 4/1993 | Miller | |
| 5,204,894 A | 4/1993 | Darden | |
| 5,206,901 A | 4/1993 | Harlow et al. | |
| 5,208,848 A | 5/1993 | Pula | |
| 5,215,011 A | 6/1993 | Monney | |
| 5,216,233 A | 6/1993 | Main | |
| 5,218,187 A | 6/1993 | Koenck | |
| 5,218,188 A | 6/1993 | Hanson | |
| 5,223,699 A | 6/1993 | Flynn et al. | |
| 5,223,820 A | 6/1993 | Sutterlin | |
| 5,225,071 A | 7/1993 | Coughlin | |
| 5,226,075 A | 7/1993 | Funk et al. | |
| 5,227,614 A | 7/1993 | Danielson | |
| 5,231,492 A | 7/1993 | Dangi et al. | |
| 5,235,317 A | 8/1993 | Sutterlin | |
| 5,237,604 A | 8/1993 | Ryan | |
| 5,241,588 A | 8/1993 | Babson et al. | |
| 5,243,645 A | 9/1993 | Bissell et al. | |
| 5,243,654 A | 9/1993 | Hunter | |
| 5,247,571 A | 9/1993 | Kay et al. | |
| 5,254,971 A | 10/1993 | Sutterlin | |
| 5,260,986 A | 11/1993 | Pershan | |
| 5,263,080 A | 11/1993 | Jones et al. | |
| 5,265,155 A | 11/1993 | Castro | |
| 5,272,749 A | 12/1993 | Masek | |
| 5,274,696 A | 12/1993 | Perelman | |
| 5,280,159 A | 1/1994 | Schultz et al. | |
| 5,287,199 A | 2/1994 | Zoccolillo | |
| 5,289,378 A | 2/1994 | Miller | |
| 5,289,468 A | 2/1994 | Yoshida | |
| 5,295,154 A | 3/1994 | Meier | |
| 5,303,297 A | 4/1994 | Hillis | |
| 5,305,181 A | 4/1994 | Schultz | |
| 5,308,966 A | 5/1994 | Danielson | |
| 5,309,437 A | 5/1994 | Perlman et al. | |
| 5,311,583 A | 5/1994 | Friedes et al. | |
| 5,313,053 A | 5/1994 | Koenck | |
| 5,317,566 A | 5/1994 | Joshi | |
| 5,317,691 A | 5/1994 | Traeger | |
| 5,318,719 A | 6/1994 | Hughes | |
| 5,322,991 A | 6/1994 | Hanson | |
| 5,325,421 A | 6/1994 | Hou et al. | |
| 5,327,421 A | 7/1994 | Hiller et al. | |
| 5,327,486 A | 7/1994 | Wolff et al. | |
| 5,329,520 A | 7/1994 | Richardson | |

| | | | | | | |
|---|---|---|---|---|---|---|
| 5,329,578 A | 7/1994 | Brennan et al. | 5,466,170 A | 11/1995 | Pavek | |
| 5,331,580 A | 7/1994 | Miller | 5,468,947 A | 11/1995 | Danielson | |
| 5,333,266 A | 7/1994 | Boaz | 5,468,950 A | 11/1995 | Hanson | |
| 5,341,374 A | 8/1994 | Lewen et al. | 5,469,496 A | 11/1995 | Emery et al. | |
| 5,345,446 A | 9/1994 | Hiller et al. | 5,469,497 A | 11/1995 | Pierce et al. | |
| 5,346,611 A | 9/1994 | Coughlin | 5,469,500 A | 11/1995 | Satter et al. | |
| 5,347,633 A | 9/1994 | Ashfield et al. | 5,473,608 A | 12/1995 | Gagne et al. | |
| 5,349,497 A | 9/1994 | Hanson | 5,473,677 A | 12/1995 | D'Amato et al. | |
| 5,349,678 A | 9/1994 | Morris | 5,475,732 A | 12/1995 | Pester, III | |
| 5,351,286 A | 9/1994 | Nici | 5,475,737 A | 12/1995 | Garner et al. | |
| 5,353,331 A | 10/1994 | Emery et al. | 5,475,748 A | 12/1995 | Jones | |
| 5,359,185 A | 10/1994 | Hanson | 5,475,817 A | 12/1995 | Waldo et al. | |
| 5,361,256 A | 11/1994 | Doeringer et al. | 5,477,531 A | 12/1995 | McKee et al. | |
| 5,365,524 A | 11/1994 | Hiller et al. | 5,478,581 A | 12/1995 | Christie | |
| 5,365,546 A | 11/1994 | Koenck | 5,479,494 A | 12/1995 | Clitherow | |
| 5,367,566 A | 11/1994 | Moe et al. | 5,481,603 A * | 1/1996 | Gutierrez et al. | 379/221.09 |
| 5,371,858 A | 12/1994 | Miller | 5,483,527 A * | 1/1996 | Doshi et al. | 370/399 |
| 5,375,068 A | 12/1994 | Palmer et al. | 5,483,549 A | 1/1996 | Weinberg et al. | |
| 5,375,159 A | 12/1994 | Williams | 5,483,586 A | 1/1996 | Sussman | |
| 5,377,186 A | 12/1994 | Wegner et al. | 5,483,587 A | 1/1996 | Hogan et al. | |
| 5,381,465 A | 1/1995 | Carter et al. | 5,483,676 A | 1/1996 | Mahany | |
| 5,384,831 A | 1/1995 | Creswell et al. | 5,487,111 A | 1/1996 | Slusky | |
| 5,384,840 A | 1/1995 | Blatchford et al. | 5,488,575 A | 1/1996 | Danielson | |
| 5,386,467 A | 1/1995 | Ahmad | 5,490,247 A | 2/1996 | Tung et al. | |
| 5,390,175 A | 2/1995 | Hiller et al. | 5,493,568 A | 2/1996 | Sampat et al. | |
| 5,390,335 A | 2/1995 | Stephan et al. | 5,493,573 A | 2/1996 | Kobayashi et al. | |
| 5,392,344 A | 2/1995 | Ash et al. | 5,495,521 A | 2/1996 | Rangachar | |
| 5,394,436 A | 2/1995 | Meier | 5,500,859 A | 3/1996 | Sharma et al. | |
| 5,396,542 A | 3/1995 | Alger et al. | 5,500,889 A | 3/1996 | Baker et al. | |
| 5,400,393 A | 3/1995 | Knuth | 5,504,746 A | 4/1996 | Meier | |
| 5,402,478 A | 3/1995 | Hluchyj et al. | 5,506,887 A | 4/1996 | Emery et al. | |
| 5,406,557 A | 4/1995 | Baudoin | 5,506,893 A | 4/1996 | Buscher et al. | |
| 5,408,237 A | 4/1995 | Patterson et al. | 5,511,111 A | 4/1996 | Serbetcioglu et al. | |
| 5,408,382 A | 4/1995 | Schultz | 5,513,127 A | 4/1996 | Gard et al. | |
| 5,410,141 A | 4/1995 | Koenck | 5,515,303 A | 5/1996 | Cargin, Jr. | |
| 5,410,754 A | 4/1995 | Klotzbach et al. | 5,517,434 A | 5/1996 | Hanson | |
| 5,416,842 A | 5/1995 | Aziz | 5,517,560 A | 5/1996 | Greenspan | |
| 5,418,844 A | 5/1995 | Morrisey et al. | 5,521,719 A | 5/1996 | Yamada | |
| 5,420,211 A | 5/1995 | Hughes | 5,521,924 A | 5/1996 | Kakuma et al. | |
| 5,420,916 A | 5/1995 | Sekiguchi | 5,524,137 A | 6/1996 | Rhee | |
| 5,422,882 A | 6/1995 | Hiller et al. | 5,524,145 A | 6/1996 | Parker | |
| 5,422,940 A | 6/1995 | Endo et al. | 5,526,353 A | 6/1996 | Henley et al. | |
| 5,422,941 A | 6/1995 | Hasenauer et al. | 5,526,416 A | 6/1996 | Dezonno et al. | |
| 5,425,028 A | 6/1995 | Britton et al. | 5,526,489 A | 6/1996 | Nilakatan et al. | |
| 5,425,051 A | 6/1995 | Mahany | 5,528,539 A | 6/1996 | Ong | |
| 5,425,085 A | 6/1995 | Weinberger et al. | 5,530,744 A | 6/1996 | Charalambous et al. | |
| 5,425,090 A | 6/1995 | Orriss | 5,530,852 A | 6/1996 | Meske et al. | |
| 5,425,091 A | 6/1995 | Josephs | 5,537,470 A | 7/1996 | Lee | |
| 5,426,636 A | 6/1995 | Hiller et al. | 5,539,193 A | 7/1996 | Gibbs | |
| 5,428,608 A | 6/1995 | Freeman et al. | 5,539,194 A | 7/1996 | Miller | |
| 5,428,636 A | 6/1995 | Meier | 5,539,884 A | 7/1996 | Robrock, II | |
| 5,430,719 A | 7/1995 | Weisser, Jr. | 5,539,886 A | 7/1996 | Aldred et al. | |
| 5,430,727 A | 7/1995 | Callon | 5,541,398 A | 7/1996 | Hanson | |
| 5,434,852 A | 7/1995 | La Porta et al. | 5,541,917 A | 7/1996 | Farris | |
| 5,434,913 A | 7/1995 | Tung et al. | 5,541,927 A | 7/1996 | Kristol et al. | |
| 5,436,957 A | 7/1995 | McConnell | 5,541,930 A | 7/1996 | Klingman | |
| 5,436,963 A | 7/1995 | Fitzpatrick et al. | 5,544,010 A | 8/1996 | Schultz | |
| 5,440,563 A | 8/1995 | Isidoro et al. | 5,551,025 A | 8/1996 | O'Reilly et al. | |
| 5,440,620 A | 8/1995 | Slusky | 5,551,035 A | 8/1996 | Arnold et al. | |
| 5,440,621 A | 8/1995 | Castro | 5,555,276 A | 9/1996 | Koenck | |
| 5,442,690 A | 8/1995 | Nazif et al. | 5,559,068 A | 9/1996 | Chen | |
| 5,444,709 A | 8/1995 | Riddle | 5,559,721 A | 9/1996 | Ishii | |
| 5,448,633 A | 9/1995 | Jamaleddin et al. | 5,559,871 A | 9/1996 | Smith | |
| 5,450,411 A | 9/1995 | Heil | 5,561,670 A | 10/1996 | Hoffert et al. | |
| 5,452,287 A | 9/1995 | DiCecco et al. | 5,563,882 A | 10/1996 | Bruno et al. | |
| 5,452,289 A | 9/1995 | Sharma et al. | 5,568,645 A | 10/1996 | Morris | |
| 5,452,350 A | 9/1995 | Reynolds et al. | 5,572,583 A | 11/1996 | Wheeler, Jr. et al. | |
| 5,455,821 A | 10/1995 | Schaeffer et al. | 5,576,529 A | 11/1996 | Koenck | |
| 5,457,629 A | 10/1995 | Miller | 5,579,472 A | 11/1996 | Keywort et al. | |
| 5,459,775 A | 10/1995 | Isono et al. | 5,583,564 A | 12/1996 | Rao | |
| 5,461,611 A | 10/1995 | Drake et al. | 5,583,920 A | 12/1996 | Wheeler, Jr. | |
| 5,463,677 A | 10/1995 | Bash et al. | 5,583,926 A | 12/1996 | Venier et al. | |
| 5,465,207 A | 11/1995 | Boatwright | 5,583,929 A | 12/1996 | Ardon | |

| | | | | | | |
|---|---|---|---|---|---|---|
| 5,584,784 A | 12/1996 | Wu | | 5,680,446 A | 10/1997 | Fleischer et al. |
| 5,586,175 A | 12/1996 | Hogan | | 5,680,633 A | 10/1997 | Koenck |
| 5,586,177 A | 12/1996 | Farris et al. | | 5,682,379 A | 10/1997 | Mahany |
| 5,587,577 A | 12/1996 | Schultz | | 5,687,167 A | 11/1997 | Bertin et al. |
| 5,590,127 A | 12/1996 | Bales et al. | | 5,689,550 A | 11/1997 | Garson et al. |
| 5,590,133 A | 12/1996 | Billstrom et al. | | 5,689,553 A | 11/1997 | Ahuja et al. |
| 5,590,181 A | 12/1996 | Hogan | | 5,692,039 A | 11/1997 | Brankley et al. |
| 5,590,346 A | 12/1996 | West | | 5,694,318 A | 12/1997 | Miller |
| 5,594,717 A | 1/1997 | Watanabe et al. | | 5,694,463 A | 12/1997 | Christie et al. |
| 5,594,769 A | 1/1997 | Pellegrino et al. | | 5,696,903 A | 12/1997 | Mahany |
| 5,594,789 A | 1/1997 | Seazholtz et al. | | 5,699,089 A | 12/1997 | Murray |
| 5,598,464 A | 1/1997 | Hess et al. | | 5,699,352 A | 12/1997 | Kriete et al. |
| 5,598,487 A | 1/1997 | Hacker | | 5,699,528 A | 12/1997 | Hogan |
| 5,602,456 A | 2/1997 | Cargin | | 5,701,295 A | 12/1997 | Bales et al. |
| 5,602,854 A | 2/1997 | Luse | | 5,701,465 A | 12/1997 | Baugher et al. |
| 5,603,085 A | 2/1997 | Shedlo | | 5,703,935 A | 12/1997 | Raissyan et al. |
| 5,604,682 A | 2/1997 | McLaughlin et al. | | 5,703,942 A | 12/1997 | Pinard et al. |
| 5,604,737 A | 2/1997 | Iwami et al. | | 5,706,286 A | 1/1998 | Reiman et al. |
| 5,608,446 A | 3/1997 | Carr et al. | | 5,708,680 A | 1/1998 | Gollnick |
| 5,608,447 A | 3/1997 | Farry et al. | | 5,708,833 A | 1/1998 | Kinney |
| 5,608,786 A * | 3/1997 | Gordon ............... 370/352 | | 5,710,728 A | 1/1998 | Danielson |
| 5,610,910 A | 3/1997 | Focsaneanu et al. | | 5,710,884 A | 1/1998 | Dedrick |
| 5,610,972 A | 3/1997 | Emery et al. | | 5,712,903 A | 1/1998 | Bartholomew et al. |
| 5,610,976 A | 3/1997 | Uota et al. | | 5,712,906 A | 1/1998 | Grady et al. |
| 5,610,977 A | 3/1997 | Williams et al. | | 5,712,907 A | 1/1998 | Wegner et al. |
| 5,615,251 A | 3/1997 | Hogan | | 5,712,908 A | 1/1998 | Brinkman et al. |
| 5,617,343 A | 4/1997 | Danielson | | 5,719,854 A | 2/1998 | Choudhury et al. |
| 5,617,422 A | 4/1997 | Litzenberger et al. | | 5,722,067 A | 2/1998 | Fougnies |
| 5,617,540 A | 4/1997 | Civanlar et al. | | 5,724,355 A | 3/1998 | Bruno et al. |
| 5,619,555 A | 4/1997 | Fenton et al. | | 5,724,406 A | 3/1998 | Juster |
| 5,619,557 A | 4/1997 | Van Berkum | | 5,724,412 A | 3/1998 | Srinivasan |
| 5,619,562 A | 4/1997 | Maurer et al. | | 5,726,984 A * | 3/1998 | Kubler et al. ............... 370/349 |
| 5,621,787 A | 4/1997 | McKoy et al. | | 5,727,002 A | 3/1998 | Miller et al. |
| 5,623,601 A | 4/1997 | Vu | | 5,727,129 A | 3/1998 | Barrett et al. |
| 5,625,180 A | 4/1997 | Hanson | | 5,729,544 A | 3/1998 | Lev et al. |
| 5,625,404 A | 4/1997 | Grady et al. | | 5,729,599 A | 3/1998 | Plomondon et al. |
| 5,625,407 A | 4/1997 | Biggs et al. | | 5,732,078 A | 3/1998 | Arango |
| 5,625,555 A | 4/1997 | Davis | | 5,732,213 A | 3/1998 | Gessel et al. |
| 5,625,675 A | 4/1997 | Katsumaru et al. | | 5,737,333 A | 4/1998 | Civanlar et al. |
| 5,625,677 A | 4/1997 | Feiertag et al. | | 5,737,395 A | 4/1998 | Irribarren |
| 5,625,681 A | 4/1997 | Butler, II | | 5,737,404 A * | 4/1998 | Segal ............... 379/230 |
| 5,625,682 A | 4/1997 | Gray et al. | | 5,737,414 A | 4/1998 | Walker et al. |
| 5,627,886 A | 5/1997 | Bowman | | 5,740,164 A | 4/1998 | Liron |
| 5,633,916 A | 5/1997 | Goldhagen et al. | | 5,740,366 A | 4/1998 | Mahany |
| 5,633,919 A | 5/1997 | Hogan | | 5,742,596 A | 4/1998 | Baratz et al. |
| 5,636,216 A | 6/1997 | Fox et al. | | 5,742,668 A | 4/1998 | Pepe et al. |
| 5,638,430 A | 6/1997 | Hogan | | 5,742,670 A | 4/1998 | Bennett |
| 5,640,001 A | 6/1997 | Danielson | | 5,742,675 A | 4/1998 | Kilander et al. |
| 5,644,471 A | 7/1997 | Schultz | | 5,742,905 A | 4/1998 | Pepe et al. |
| 5,646,982 A | 7/1997 | Hogan et al. | | 5,744,533 A | 4/1998 | Iwamoto et al. |
| 5,651,006 A | 7/1997 | Fujino et al. | | 5,747,785 A | 5/1998 | Miller |
| 5,652,787 A | 7/1997 | O'Kelly | | 5,747,786 A | 5/1998 | Cargin, Jr. |
| 5,654,957 A | 8/1997 | Koyama | | 5,748,468 A | 5/1998 | Notenboom et al. |
| 5,657,250 A | 8/1997 | Park et al. | | 5,748,619 A | 5/1998 | Meier |
| 5,657,317 A | 8/1997 | Mahany | | 5,751,707 A | 5/1998 | Voit et al. |
| 5,661,197 A | 8/1997 | Villiger et al. | | 5,751,961 A | 5/1998 | Smyk |
| 5,661,782 A | 8/1997 | Bartholomew et al. | | 5,754,639 A | 5/1998 | Flockhart et al. |
| 5,661,790 A * | 8/1997 | Hsu ............... 379/209.01 | | 5,754,641 A | 5/1998 | Voit et al. |
| 5,661,792 A | 8/1997 | Akinpelu et al. | | 5,757,784 A | 5/1998 | Liebowitz et al. |
| 5,663,208 A | 9/1997 | Martin | | 5,758,281 A | 5/1998 | Emery et al. |
| 5,664,005 A | 9/1997 | Emery et al. | | 5,761,294 A | 6/1998 | Shaffer et al. |
| 5,664,102 A | 9/1997 | Faynberg | | 5,763,867 A | 6/1998 | Main |
| 5,668,857 A | 9/1997 | McHale | | 5,764,741 A | 6/1998 | Barak |
| 5,669,062 A | 9/1997 | Olds et al. | | 5,768,513 A | 6/1998 | Kuthyar et al. |
| 5,671,436 A | 9/1997 | Morrison | | 5,774,530 A | 6/1998 | Montgomery et al. |
| 5,672,860 A | 9/1997 | Miller | | 5,774,533 A | 6/1998 | Patel |
| 5,673,031 A | 9/1997 | Meier | | 5,774,535 A | 6/1998 | Castro |
| 5,673,263 A | 9/1997 | Basso et al. | | 5,774,660 A | 6/1998 | Brendel et al. |
| 5,675,507 A | 10/1997 | Bobo, II | | 5,774,695 A * | 6/1998 | Autrey et al. ............... 703/26 |
| 5,675,741 A | 10/1997 | Aggarwal et al. | | 5,778,313 A | 7/1998 | Fougnies |
| 5,679,943 A | 10/1997 | Schultz et al. | | 5,781,550 A | 7/1998 | Templin et al. |
| 5,680,392 A | 10/1997 | Semaan | | 5,781,620 A | 7/1998 | Montgomery et al. |
| 5,680,442 A | 10/1997 | Bartholomew et al. | | 5,781,624 A | 7/1998 | Mitra et al. |

| | | | | | | |
|---|---|---|---|---|---|---|
| 5,784,617 A | 7/1998 | Greenstein et al. | | 5,898,673 A | 4/1999 | Riggan et al. |
| 5,787,160 A | 7/1998 | Chaney et al. | | 5,901,140 A | 5/1999 | Van As et al. |
| 5,790,172 A | 8/1998 | Imanaka | | 5,903,558 A | 5/1999 | Jones et al. |
| 5,790,536 A | 8/1998 | Mahany | | 5,905,736 A | 5/1999 | Ronen et al. |
| 5,790,548 A | 8/1998 | Sistani zadeh et al. | | 5,907,547 A | 5/1999 | Foladare et al. |
| 5,790,806 A | 8/1998 | Koperda | | 5,910,946 A | 6/1999 | Csapo |
| 5,793,762 A * | 8/1998 | Penners et al. ............... 370/389 | | 5,912,887 A | 6/1999 | Sehgal |
| 5,793,763 A | 8/1998 | Mayes et al. | | 5,914,481 A | 6/1999 | Danielson |
| 5,793,771 A | 8/1998 | Darland et al. | | 5,915,001 A | 6/1999 | Uppaluru |
| 5,796,790 A | 8/1998 | Brunner | | 5,915,005 A | 6/1999 | He |
| 5,799,072 A | 8/1998 | Vulcan et al. | | 5,915,008 A * | 6/1999 | Dulman ................. 379/221.08 |
| 5,799,156 A | 8/1998 | Hogan | | 5,915,012 A | 6/1999 | Miloslavsky |
| 5,802,502 A | 9/1998 | Gell et al. | | 5,917,175 A | 6/1999 | Miller |
| 5,802,510 A | 9/1998 | Jones | | 5,917,424 A | 6/1999 | Goldman et al. |
| 5,802,513 A * | 9/1998 | Bowie, III ....................... 707/3 | | 5,918,179 A | 6/1999 | Foladare et al. |
| 5,804,805 A | 9/1998 | Koenck | | 5,923,659 A | 7/1999 | Curry et al. |
| 5,805,474 A | 9/1998 | Danielson | | 5,926,482 A | 7/1999 | Christie |
| 5,805,587 A | 9/1998 | Norris | | 5,928,292 A | 7/1999 | Miller |
| 5,805,682 A | 9/1998 | Voit et al. | | 5,930,343 A | 7/1999 | Vasquez |
| 5,805,807 A | 9/1998 | Hanson | | 5,930,700 A | 7/1999 | Pepper |
| 5,809,128 A | 9/1998 | McMullin | | 5,933,425 A | 8/1999 | Iwata |
| 5,812,534 A | 9/1998 | Davis et al. | | 5,936,958 A | 8/1999 | Soumiya et al. |
| 5,812,639 A | 9/1998 | Bartholomew et al. | | 5,937,045 A | 8/1999 | Yaoya et al. |
| 5,812,795 A | 9/1998 | Horovitz et al. | | 5,940,479 A | 8/1999 | Guy et al. |
| 5,812,865 A | 9/1998 | Theimer et al. | | 5,940,598 A | 8/1999 | Strauss et al. |
| 5,818,836 A | 10/1998 | DuVal | | 5,940,616 A | 8/1999 | Wang |
| 5,818,921 A | 10/1998 | Vander Meiden et al. | | 5,940,771 A | 8/1999 | Gollnick |
| 5,825,780 A | 10/1998 | Christie | | 5,944,795 A | 8/1999 | Civanlar |
| 5,825,862 A | 10/1998 | Voit et al. | | 5,946,299 A | 8/1999 | Blonder |
| 5,825,863 A | 10/1998 | Walker | | 5,946,386 A | 8/1999 | Rogers et al. |
| 5,825,869 A | 10/1998 | Brooks et al. | | 5,949,056 A | 9/1999 | White |
| 5,826,268 A | 10/1998 | Schaefer et al. | | 5,949,776 A | 9/1999 | Mahany |
| 5,828,737 A | 10/1998 | Sawyer | | 5,949,869 A | 9/1999 | Sink |
| 5,828,740 A | 10/1998 | Khuc et al. | | 5,953,322 A | 9/1999 | Kimball |
| 5,828,844 A | 10/1998 | Civanlar et al. | | 5,953,338 A | 9/1999 | Ma et al. |
| 5,832,197 A | 11/1998 | Houji | | 5,953,504 A | 9/1999 | Sokal et al. |
| 5,834,753 A | 11/1998 | Danielson | | 5,953,651 A * | 9/1999 | Lu et al. ..................... 455/408 |
| 5,835,723 A | 11/1998 | Andrews et al. | | 5,956,391 A | 9/1999 | Melen et al. |
| 5,838,665 A | 11/1998 | Kahn et al. | | 5,956,482 A | 9/1999 | Agraharam et al. |
| 5,838,682 A * | 11/1998 | Dekelbaum et al. ......... 370/401 | | 5,956,697 A | 9/1999 | Usui |
| 5,838,686 A | 11/1998 | Ozkan | | 5,958,016 A | 9/1999 | Chang et al. |
| 5,838,970 A | 11/1998 | Thomas | | 5,958,052 A | 9/1999 | Bellovin et al. |
| 5,841,764 A | 11/1998 | Roderique et al. | | 5,959,998 A | 9/1999 | Takahashi et al. |
| 5,844,893 A | 12/1998 | Gollnick | | 5,966,431 A * | 10/1999 | Reiman et al. ......... 379/115.01 |
| 5,844,896 A | 12/1998 | Marks et al. | | 5,966,434 A | 10/1999 | Schafer et al. |
| 5,845,267 A | 12/1998 | Ronen | | 5,969,321 A | 10/1999 | Danielson |
| 5,848,143 A | 12/1998 | Andrews et al. | | 5,970,065 A | 10/1999 | Miloslavsky |
| 5,850,358 A | 12/1998 | Danielson | | 5,970,477 A | 10/1999 | Roden |
| 5,850,433 A | 12/1998 | Rondeau | | 5,974,043 A | 10/1999 | Solomon |
| 5,854,833 A | 12/1998 | Hogan | | 5,974,052 A | 10/1999 | Johnson et al. |
| 5,854,975 A | 12/1998 | Fougnies | | 5,978,569 A | 11/1999 | Traeger |
| 5,862,171 A | 1/1999 | Mahany | | 5,978,840 A | 11/1999 | Nguyen et al. |
| 5,864,604 A | 1/1999 | Moen et al. | | 5,979,768 A | 11/1999 | Koenck |
| 5,864,610 A | 1/1999 | Ronen | | 5,982,774 A | 11/1999 | Foladare et al. |
| 5,867,495 A | 2/1999 | Elliott et al. | | 5,987,108 A | 11/1999 | Jagadish et al. |
| 5,867,562 A | 2/1999 | Scherer | | 5,987,499 A | 11/1999 | Morris |
| 5,867,566 A | 2/1999 | Hogan | | 5,991,291 A | 11/1999 | Asai et al. |
| 5,870,565 A | 2/1999 | Glitho | | 5,991,292 A | 11/1999 | Focsaneanu et al. |
| 5,873,099 A | 2/1999 | Hogan | | 5,991,301 A | 11/1999 | Christie |
| 5,878,126 A | 3/1999 | Velamuri et al. | | 5,991,308 A | 11/1999 | Furhmann et al. |
| 5,878,130 A * | 3/1999 | Andrews et al. ....... 379/265.09 | | 5,991,864 A | 11/1999 | Kinney |
| 5,878,212 A | 3/1999 | Civanlar et al. | | 5,995,503 A | 11/1999 | Crawley et al. |
| 5,881,134 A | 3/1999 | Foster et al. | | 5,995,606 A | 11/1999 | Civanlar et al. |
| 5,883,891 A | 3/1999 | Williams et al. | | 5,999,524 A | 12/1999 | Corbalis et al. |
| 5,884,032 A | 3/1999 | Bateman et al. | | 5,999,525 A | 12/1999 | Krishnaswamy |
| 5,888,087 A | 3/1999 | Hanson | | 6,005,926 A | 12/1999 | Mashinsky |
| 5,889,774 A | 3/1999 | Mirashrafi et al. | | 6,006,100 A | 12/1999 | Koenck |
| 5,892,754 A | 4/1999 | Kompella et al. | | 6,006,253 A | 12/1999 | Kumar et al. |
| 5,892,822 A | 4/1999 | Gottlieb et al. | | 6,011,975 A | 1/2000 | Emery et al. |
| 5,892,971 A | 4/1999 | Danielson | | 6,012,088 A | 1/2000 | Li et al. |
| 5,895,431 A | 4/1999 | Miller | | 6,014,379 A | 1/2000 | White et al. |
| 5,895,906 A | 4/1999 | Danielson | | 6,014,687 A | 1/2000 | Watanabe et al. |
| 5,898,668 A | 4/1999 | Shaffer | | 6,016,307 A | 1/2000 | Kaplan et al. |

| | | | | | | | |
|---|---|---|---|---|---|---|---|
| 6,016,343 | A | 1/2000 | Hogan | 6,185,184 | B1 | 2/2001 | Mattaway |
| 6,018,360 | A | 1/2000 | Stewart et al. | 6,185,198 | B1 | 2/2001 | LaDue |
| 6,018,567 | A | 1/2000 | Dulman | 6,188,677 | B1 | 2/2001 | Oyama et al. |
| 6,021,126 | A | 2/2000 | White et al. | 6,192,050 | B1 | 2/2001 | Stovall |
| 6,021,263 | A | 2/2000 | Kujoory et al. | 6,192,400 | B1 | 2/2001 | Hanson |
| 6,023,147 | A | 2/2000 | Cargin | 6,195,425 | B1 | 2/2001 | Farris et al. |
| 6,023,474 | A | 2/2000 | Gardner et al. | 6,198,738 | B1 | 3/2001 | Chang et al. |
| 6,026,087 | A | 2/2000 | Mirashrafi et al. | 6,201,812 | B1 | 3/2001 | Christie |
| 6,026,091 | A | 2/2000 | Christie | 6,205,139 | B1 | 3/2001 | Voit |
| 6,028,858 | A | 2/2000 | Rivers et al. | 6,212,162 | B1 | 4/2001 | Horlin |
| 6,029,062 | A | 2/2000 | Hanson | 6,212,193 | B1 | 4/2001 | Christie |
| 6,029,261 | A | 2/2000 | Hartmann | 6,215,790 | B1 | 4/2001 | Voit et al. |
| 6,031,840 | A | 2/2000 | Christie | 6,222,919 | B1 | 4/2001 | Hollatz et al. |
| 6,035,028 | A | 3/2000 | Ward et al. | 6,226,287 | B1 * | 5/2001 | Brady ................. 370/352 |
| 6,036,093 | A | 3/2000 | Schultz | 6,226,678 | B1 | 5/2001 | Mattaway |
| 6,041,109 | A | 3/2000 | Cardy et al. | 6,230,203 | B1 | 5/2001 | Koperda et al. |
| 6,041,117 | A | 3/2000 | Androski et al. | 6,233,604 | B1 | 5/2001 | Van Horne et al. |
| 6,044,081 | A | 3/2000 | Bell et al. | 6,236,851 | B1 | 5/2001 | Fougnies |
| 6,046,992 | A | 4/2000 | Meier | 6,240,091 | B1 | 5/2001 | Ginzboorg et al. |
| 6,047,051 | A | 4/2000 | Ginzboorg et al. | 6,243,373 | B1 | 6/2001 | Turock |
| 6,047,326 | A | 4/2000 | Kilkki | 6,243,374 | B1 | 6/2001 | White |
| 6,049,545 | A | 4/2000 | Stephenson et al. | 6,252,869 | B1 | 6/2001 | Silverman |
| 6,049,813 | A | 4/2000 | Danielson | 6,260,067 | B1 | 7/2001 | Barnhouse et al. |
| 6,052,445 | A | 4/2000 | Bashoura et al. | 6,263,372 | B1 | 7/2001 | Hogan |
| 6,052,450 | A | 4/2000 | Allison et al. | 6,266,685 | B1 | 7/2001 | Danielson |
| 6,058,000 | A | 5/2000 | Koenck | 6,278,693 | B1 | 8/2001 | Aldred et al. |
| 6,064,653 | A | 5/2000 | Farris | 6,278,704 | B1 | 8/2001 | Creamer et al. |
| 6,069,890 | A | 5/2000 | White et al. | 6,279,038 | B1 | 8/2001 | Hogan |
| 6,075,783 | A | 6/2000 | Voit | 6,282,192 | B1 | 8/2001 | Murphy et al. |
| 6,078,582 | A | 6/2000 | Curry et al. | 6,282,281 | B1 | 8/2001 | Low |
| 6,078,943 | A | 6/2000 | Yu | 6,282,284 | B1 | 8/2001 | Dezonno et al. |
| 6,081,525 | A | 6/2000 | Christie | 6,282,574 | B1 | 8/2001 | Voit et al. |
| 6,084,867 | A | 7/2000 | Meier | 6,285,745 | B1 * | 9/2001 | Bartholomew et al. ... 379/88.17 |
| 6,088,431 | A | 7/2000 | LaDue | 6,289,010 | B1 | 9/2001 | Voit et al. |
| 6,097,804 | A * | 8/2000 | Gilbert et al. ............... 379/230 | 6,292,478 | B1 | 9/2001 | Farris |
| 6,098,094 | A | 8/2000 | Barnhouse et al. | 6,292,479 | B1 | 9/2001 | Bartholomew et al. |
| 6,101,182 | A | 8/2000 | Sistanizadeh et al. | 6,292,481 | B1 | 9/2001 | Voit et al. |
| 6,104,645 | A | 8/2000 | Ong | 6,295,292 | B1 | 9/2001 | Voit et al. |
| 6,104,704 | A | 8/2000 | Buhler et al. | 6,298,057 | B1 | 10/2001 | Guy |
| 6,104,711 | A | 8/2000 | Voit | 6,298,062 | B1 | 10/2001 | Gardell et al. |
| 6,108,341 | A | 8/2000 | Christie | 6,298,064 | B1 | 10/2001 | Christie |
| 6,108,704 | A | 8/2000 | Hutton | 6,298,120 | B1 | 10/2001 | Civanlar et al. |
| 6,112,206 | A | 8/2000 | Morris | 6,301,609 | B1 * | 10/2001 | Aravamudan et al. ....... 709/207 |
| 6,115,458 | A | 9/2000 | Taskett | 6,304,567 | B1 | 10/2001 | Rosenberg |
| 6,115,737 | A | 9/2000 | Ely et al. | 6,310,873 | B1 | 10/2001 | Rainis et al. |
| 6,118,936 | A * | 9/2000 | Lauer et al. ................. 709/224 | 6,314,103 | B1 | 11/2001 | Medhat |
| 6,122,255 | A | 9/2000 | Bartholomew et al. | 6,324,264 | B1 | 11/2001 | Wiener et al. |
| 6,125,113 | A | 9/2000 | Farris et al. | 6,327,258 | B1 * | 12/2001 | Deschaine et al. .......... 370/356 |
| 6,125,126 | A | 9/2000 | Hallenstal | 6,330,250 | B1 | 12/2001 | Curry et al. |
| 6,128,304 | A | 10/2000 | Gardell et al. | 6,332,023 | B1 | 12/2001 | Porter et al. |
| 6,131,121 | A | 10/2000 | Mattaway | 6,335,927 | B1 | 1/2002 | Elliott |
| 6,134,235 | A | 10/2000 | Goldman et al. | 6,343,115 | B1 | 1/2002 | Foladare et al. |
| 6,134,433 | A | 10/2000 | Joong et al. | 6,347,084 | B1 | 2/2002 | Fougnies |
| 6,134,530 | A | 10/2000 | Bunting et al. | 6,347,085 | B2 | 2/2002 | Kelly |
| 6,137,792 | A | 10/2000 | Jonas et al. | 6,359,880 | B1 | 3/2002 | Curry |
| 6,141,404 | A | 10/2000 | Westerlage et al. | 6,363,065 | B1 | 3/2002 | Thornton et al. |
| 6,141,412 | A | 10/2000 | Smith et al. | 6,373,929 | B1 * | 4/2002 | Johnson et al. ......... 379/114.02 |
| 6,144,647 | A | 11/2000 | Lopez-Torres | 6,374,302 | B1 | 4/2002 | Galasso et al. |
| 6,144,661 | A | 11/2000 | Katsube et al. | 6,375,344 | B1 | 4/2002 | Hanson |
| 6,144,667 | A | 11/2000 | Doshi et al. | 6,381,321 | B1 | 4/2002 | Brown et al. |
| 6,144,976 | A | 11/2000 | Silva | 6,385,191 | B1 | 5/2002 | Coffman et al. |
| 6,149,062 | A | 11/2000 | Danielson | 6,385,193 | B1 | 5/2002 | Civanlar et al. |
| 6,154,445 | A | 11/2000 | Farris et al. | 6,400,702 | B1 | 6/2002 | Meier |
| 6,154,777 | A | 11/2000 | Ebrahim | 6,407,991 | B1 | 6/2002 | Meier |
| 6,157,621 | A | 12/2000 | Brown et al. | 6,430,195 | B1 | 8/2002 | Christie |
| 6,157,636 | A | 12/2000 | Voit et al. | 6,430,275 | B1 | 8/2002 | Voit et al. |
| 6,157,648 | A | 12/2000 | Voit et al. | 6,438,218 | B1 | 8/2002 | Farris |
| 6,157,823 | A | 12/2000 | Fougnies | 6,449,259 | B1 | 9/2002 | Allain et al. |
| 6,169,735 | B1 | 1/2001 | Alle et al. | 6,449,356 | B1 | 9/2002 | Dezonno |
| 6,175,618 | B1 | 1/2001 | Shah et al. | 6,456,617 | B1 | 9/2002 | Oda et al. |
| 6,181,690 | B1 | 1/2001 | Civanlar | 6,480,588 | B1 | 11/2002 | Donovan |
| 6,181,695 | B1 | 1/2001 | Curry et al. | 6,493,353 | B2 | 12/2002 | Kelly et al. |
| 6,181,703 | B1 | 1/2001 | Christie | 6,498,788 | B1 | 12/2002 | Emilsson et al. |

| Patent No. | Date | Name | |
|---|---|---|---|
| 6,513,066 B1 | 1/2003 | Hutton | |
| 6,529,516 B1 | 3/2003 | Parzych | |
| 6,539,015 B2 | 3/2003 | Voit et al. | |
| 6,539,077 B1* | 3/2003 | Ranalli et al. | 379/67.1 |
| 6,542,497 B1 | 4/2003 | Curry | |
| 6,546,003 B1 | 4/2003 | Farris | |
| 6,574,216 B1 | 6/2003 | Farris et al. | |
| 6,574,681 B1 | 6/2003 | White | |
| 6,584,093 B1 | 6/2003 | Salama et al. | |
| 6,594,254 B1 | 7/2003 | Kelly | |
| 6,600,733 B2 | 7/2003 | Deng | |
| 6,600,735 B1 | 7/2003 | Iwama et al. | |
| 6,614,768 B1 | 9/2003 | Mahany | |
| 6,614,781 B1 | 9/2003 | Elliott | |
| 6,621,942 B1 | 9/2003 | Hacker | |
| 6,625,170 B1 | 9/2003 | Curry et al. | |
| 6,633,846 B1 | 10/2003 | Bennett et al. | |
| 6,643,362 B2 | 11/2003 | Hogan | |
| 6,654,357 B1 | 11/2003 | Wiedeman | |
| 6,671,285 B1 | 12/2003 | Kirkby et al. | |
| 6,678,718 B1 | 1/2004 | Khouri et al. | |
| 6,681,994 B1 | 1/2004 | Koenck | |
| 6,687,738 B1 | 2/2004 | Hutton | |
| 6,688,523 B1 | 2/2004 | Koenck | |
| 6,690,788 B1 | 2/2004 | Bauer et al. | |
| 6,694,359 B1 | 2/2004 | Morris | |
| 6,701,365 B1 | 3/2004 | Hutton | |
| 6,704,287 B1* | 3/2004 | Moharram | 370/242 |
| 6,711,241 B1* | 3/2004 | White et al. | 379/88.17 |
| 6,714,559 B1 | 3/2004 | Meier | |
| 6,714,983 B1 | 3/2004 | Koenck | |
| 6,754,181 B1 | 6/2004 | Elliott et al. | |
| 6,760,429 B1 | 7/2004 | Hung et al. | |
| 6,775,519 B1 | 8/2004 | Wiedeman et al. | |
| 6,792,256 B1 | 9/2004 | Kinney | |
| 6,810,033 B2 | 10/2004 | Derks | |
| 6,823,384 B1 | 11/2004 | Wilson et al. | |
| 6,826,165 B1 | 11/2004 | Meier | |
| 6,829,645 B1 | 12/2004 | Hutton | |
| 6,839,340 B1 | 1/2005 | Voit et al. | |
| 6,870,827 B1 | 3/2005 | Voit et al. | |
| 6,885,678 B2 | 4/2005 | Curry et al. | |
| 6,895,419 B1 | 5/2005 | Cargin | |
| 6,910,632 B2 | 6/2005 | Koerck | |
| 6,925,054 B1 | 8/2005 | Atterton et al. | |
| 6,990,090 B2 | 1/2006 | Meier | |
| 7,012,898 B1 | 3/2006 | Farris et al. | |
| 7,013,001 B1 | 3/2006 | Felger et al. | |
| 7,079,534 B1 | 7/2006 | Medhat | |
| 7,085,362 B1 | 8/2006 | Christie | |
| 7,088,705 B2 | 8/2006 | Curry | |
| 7,092,379 B1 | 8/2006 | Singh et al. | |
| 7,120,319 B2 | 10/2006 | Danielson | |
| 7,149,208 B2 | 12/2006 | Mattaway | |
| 7,170,887 B2 | 1/2007 | Rosenberg | |
| 7,206,592 B1 | 4/2007 | Gollnick | |
| 7,236,575 B2 | 6/2007 | Kim et al. | |
| 7,274,662 B2 | 9/2007 | Kalmanek, Jr. et al. | |
| 7,286,562 B1 | 10/2007 | Vargo et al. | |
| 7,295,830 B2 | 11/2007 | Lippelt | |
| 7,359,972 B2* | 4/2008 | Jorgensen | 709/226 |
| 7,492,886 B1* | 2/2009 | Kalmanek et al. | 379/220.01 |
| 7,502,339 B1* | 3/2009 | Pirkola et al. | 370/310 |
| 2002/0064149 A1 | 5/2002 | Elliott | |
| 2002/0067739 A1* | 6/2002 | Wilkes et al. | 370/465 |
| 2002/0083166 A1 | 6/2002 | Dugan et al. | |
| 2002/0114324 A1* | 8/2002 | Low et al. | 370/352 |
| 2002/0159461 A1 | 10/2002 | Hamamoto et al. | |
| 2003/0078006 A1 | 4/2003 | Mahany | |
| 2003/0112767 A1 | 6/2003 | Meier | |
| 2003/0169767 A1 | 9/2003 | Christie | |
| 2003/0189941 A1 | 10/2003 | Christie | |
| 2003/0193933 A1 | 10/2003 | Jones | |
| 2003/0198218 A1* | 10/2003 | Farris et al. | 370/356 |
| 2003/0198335 A1 | 10/2003 | Porter et al. | |
| 2004/0005046 A1 | 1/2004 | Deo et al. | |
| 2004/0018851 A1 | 1/2004 | Koenck | |
| 2004/0023651 A1 | 2/2004 | Gollnick | |
| 2004/0038717 A1 | 2/2004 | Mahany | |
| 2004/0039846 A1 | 2/2004 | Goss et al. | |
| 2004/0044667 A1 | 3/2004 | Mahany | |
| 2004/0073933 A1 | 4/2004 | Gollnick | |
| 2004/0090952 A1 | 5/2004 | Kubler | |
| 2004/0093363 A1 | 5/2004 | Cargin | |
| 2004/0114567 A1 | 6/2004 | Kubler | |
| 2004/0125753 A1 | 7/2004 | Mahany | |
| 2004/0131018 A1* | 7/2004 | Johnson et al. | 370/261 |
| 2004/0145775 A1 | 7/2004 | Kubler | |
| 2004/0146020 A1 | 7/2004 | Kubler | |
| 2004/0146037 A1 | 7/2004 | Kubler | |
| 2004/0151150 A1 | 8/2004 | Kubler | |
| 2004/0151151 A1 | 8/2004 | Kubler | |
| 2004/0151164 A1 | 8/2004 | Kubler | |
| 2004/0160912 A1 | 8/2004 | Kubler | |
| 2004/0160913 A1 | 8/2004 | Kubler | |
| 2004/0162889 A1 | 8/2004 | Morris | |
| 2004/0165573 A1 | 8/2004 | Kubler | |
| 2004/0165793 A1 | 8/2004 | Hacker | |
| 2004/0166895 A1 | 8/2004 | Koenck | |
| 2004/0169583 A1 | 9/2004 | Meier | |
| 2004/0174841 A1 | 9/2004 | Kubler | |
| 2004/0174842 A1 | 9/2004 | Kubler | |
| 2004/0174843 A1 | 9/2004 | Kubler | |
| 2004/0203834 A1 | 10/2004 | Mahany | |
| 2004/0246940 A1 | 12/2004 | Kubler | |
| 2004/0264442 A1 | 12/2004 | Kubler | |
| 2005/0008002 A1 | 1/2005 | Kubler | |
| 2005/0013266 A1 | 1/2005 | Kubler | |
| 2005/0021713 A1 | 1/2005 | Dugan et al. | |
| 2005/0036467 A1 | 2/2005 | Kubler | |
| 2005/0078647 A1 | 4/2005 | Meier | |
| 2005/0083872 A1 | 4/2005 | Kubler | |
| 2005/0087603 A1 | 4/2005 | Koenck | |
| 2005/0191989 A1 | 9/2005 | Plush et al. | |
| 2005/0195859 A1 | 9/2005 | Mahany | |
| 2005/0232213 A1 | 10/2005 | Meier | |
| 2005/0242192 A1 | 11/2005 | Koenck | |
| 2005/0254475 A1 | 11/2005 | Kubler | |
| 2006/0007951 A1 | 1/2006 | Meier | |
| 2006/0062240 A1 | 3/2006 | Meier | |
| 2006/0131420 A1 | 6/2006 | Koenck | |
| 2006/0233161 A1 | 10/2006 | Koenck | |
| 2006/0251226 A1* | 11/2006 | Hogan et al. | 379/114.15 |
| 2006/0268806 A1 | 11/2006 | Meier | |
| 2006/0268807 A1 | 11/2006 | Meier | |
| 2006/0274732 A1* | 12/2006 | Allen et al. | 370/352 |
| 2006/0274735 A1* | 12/2006 | Allen et al. | 370/356 |
| 2006/0291752 A1 | 12/2006 | Hacker | |
| 2007/0001007 A1 | 1/2007 | Koenck | |
| 2007/0007353 A1 | 1/2007 | Danielson | |
| 2007/0065026 A1 | 3/2007 | Hacker | |
| 2007/0076687 A1* | 4/2007 | Low et al. | 370/351 |
| 2007/0086445 A1 | 4/2007 | Mattaway | |
| 2007/0121529 A1 | 5/2007 | Meier | |
| 2007/0121591 A1* | 5/2007 | Donovan | 370/352 |
| 2007/0201515 A1* | 8/2007 | Lewis | 370/502 |
| 2007/0206576 A1* | 9/2007 | Radulovic | 370/352 |
| 2007/0263644 A1* | 11/2007 | Christie et al. | 370/401 |
| 2008/0013531 A1* | 1/2008 | Elliott et al. | 370/356 |
| 2008/0063161 A1* | 3/2008 | Joyce et al. | 379/114.2 |
| 2009/0022147 A1* | 1/2009 | Farris et al. | 370/352 |

FOREIGN PATENT DOCUMENTS

| | | |
|---|---|---|
| EP | 0365885 | 5/1990 |
| EP | 0381365 | 8/1990 |

| | | |
|---|---|---|
| EP | 0559979 | 9/1993 |
| EP | 0729281 | 2/1995 |
| EP | 0767568 | 10/1995 |
| EP | 0802690 | 4/1996 |
| EP | 0781016 | 6/1997 |
| EP | 0812089 | 12/1997 |
| EP | 0823809 | 2/1998 |
| EP | 0722237 | 11/2007 |
| JP | 09-168051 | 6/1997 |
| JP | 09-168063 | 6/1997 |
| JP | 09-168064 | 6/1997 |
| JP | 09-168065 | 6/1997 |
| JP | 09-172459 | 6/1997 |
| JP | 09-172462 | 6/1997 |
| WO | 91/07839 | 5/1991 |
| WO | 94/11813 | 5/1994 |
| WO | 95/22221 | 8/1995 |
| WO | 95/29564 | 11/1995 |
| WO | 96/20448 | 7/1996 |
| WO | 96/20553 | 7/1996 |
| WO | 96/32800 | 10/1996 |
| WO | 96/34341 | 10/1996 |
| WO | 96/38018 | 11/1996 |
| WO | 97/14238 | 4/1997 |
| WO | 97/22211 | 6/1997 |
| WO | 97/23078 | 6/1997 |
| WO | 97/28628 | 8/1997 |
| WO | 97/33412 | 9/1997 |
| WO | 98/12860 | 3/1998 |
| WO | 98/23080 | 5/1998 |
| WO | 98/34391 | 8/1998 |

OTHER PUBLICATIONS

Oppen et al., "The Clearinghouse: A Decentralized Agent for Locating Named Objects in a Distributed Environment", ACM Transactions on Office Information Systems, vol. 1, No. 3, Jul. 1983, pp. 230-253.

Sebestyn, I., ITU Telecommunication Standardization Sector, Study Group 15, Q;2&3/15 Rapporteur Meeting, Document AVC-1086, v1, Dec. 5, 1996.

IMTC Voice over IP Forum Service Interoperability Implementation Agreement, Draft 0.91, Document VoIP-008, Jan. 13, 1997.

Kahane et al., "Call Management Agent System Specification" VoIP Forum Technical Committee, Aug. 14, 199.

"Internet Telephony for Dummies" 2nd Edition, Chapters 14-16, 1997.

Handley et al., "SIP: Session Initiation Protocol", Internet Engineering Task Force, Internet Draft, Jul. 31, 1997, draft-ietf-mmusic-sip-03.txt, Jul. 31, 1997.

Kahane et al., "VocalTec IP Forum Contribution", VocalTec Inc., Seattle, WA, Jan. 15, 1997.

"Free World Dialup Beta 2.0a Client," Feb. 12, 1996.

"Netspeak Corporation Introduces Webphone, Industry's First Internet-Based Telephony Solution for Business Users," PC Forum, Mar. 18, 1996.

Sattler, Michael, "Nautilus Voice Encryption," May 10, 1995.

Chernov, Andrey A. "SpeakFreely" software, Apr. 18, 1996.

Stevens, "TCPIP Illustrated", vol. 1, 1994, Addison-Wesley, pp. 12-122 and inside cover.

Keiser et al., "Digital Telephony and Network Integration", 1995, Chapman Hall, Second Edition, pp. 426-428. cited by examiner.

Chopra, Manvinder, Exploring Intelligent Peripheral Configuration, Universal Personal Communications, 1994. Record., 1994 Third Annual International Conference on, Sep. 27-Oct. 1, 1994, pp. 635-639.

Weisser et al. "The Intelligence Network and Forward-Looking Technology" IEEE COMM magazine, Dec. 1988, pp. 64-69.

Shah et al. "Application of a New Network Concept for Faster Service Deployment" International Conference on COMM. 88 Jun. 12-15, 1988, IEEE Comm. Soc. Conference. Record, vol. 3, pp. 1327-1329.

Audio Messaging Interchange Specification (AMIS)—Analog Protocol, Version 1, Issue 2, Feb. 1992.

Jabbari, B., "Common Channel Signaling System No. 7 for ISDN and Intelligent Networks", Proceedings of the IEEE, vol. 79, No. 2, Feb. 1991, pp. 155-169.

"Supercharging the Web with Computer Telephony", CT and the 'Net, Mar. 1996.

"Audio and Video Over the Internet", CT and the 'Net, Computer Telephony, Mar. 1996.

Grigonis, Richard, "Computer Telephony Over The Internet", CT and the Net, Mar. 1996.

"Geek of The Week: Carl Malamud Interviews Phil Karn & Jun Murai", Internet Talk Radio, Mobile IP Networking, Nov. 1993.

McConnell, Brian, "How to Build an Internet PBX", Pacific Telephony Design, printed from http://www.phonezone.com/ip-phone.htm Mar. 5, 1997.

"Welcome to the Phone Zone", Pacific Telephony Design, http://www.phonezone.com/index2.htm, pp. 1-6.

Sears, Andrew, "Innovations in Internet Telephony: The Internet as The Competitor to The Pots Network", Innovations in Internet Telephony: The Internet as the Successor to the Pots Network, Feb. 28, 1996, pp. 1-6.

"Computer Telephony And The Internet", Stylus Innovation, http://www.stylus.com/hvml.htm.

Hedrick, C., "Routing Information Protocol", Jun. 1988, http://www.internic.net/rfc/rfc1058.txt, pp. 1-30.

Mills, D.L., "An Experimental Multiple-Path Routing Algorithm", Mar. 1986, http://www.internic.net/rfc/rfc981.txt, pp. 1-20.

Lougheed et al., "A Border Gateway Protocol (BGP)", Jun. 1990, http://www.internic.net/rfc/rfc1163.txt, pp. 1-26.

S. Deering, "Host Extensions for IP Multicasting", Aug. 1989, http://www.internic.net/rfc/rfc1112.txt, pp. 1-16.

Waitzman et al., "Distance Vector Multicast Routing Protocol", Nov. 1988, http://www.internic.net/rfc/rfc1075.txt, pp. 1-22.

Hinden et al., "The DARPA Internet Gateway", Sep. 1982, http://www.internic.net/rfc/rfc823.txt, pp. 1-41.

"VocalTec's Telephony Gateway—The Ultimate Internet Telephony Solution?," Computer Telephony Magazine, Sep. 1996.

"A Call to Phones," Wired Magazine, Issue 4.03, http://www.wired.com/wired/archive/4.03/updata.html (Mar. 1996).

Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published. Apr. 1995.

Blackwell et al. "Secure Short-Cut Routing for Mobile IP," USENIX Summary 1994 Technical Conferences, Jun. 6-10, 1994.

Okada et al. "Mobile Communication Using PHS [Personal Handy Phone System] Communications Server," National Technical Report, vol. 42, No. 1, pp. 46-54 (Feb. 1996).

Cady et al., "Mastering the Internet", Sybex Inc., Alameda, CA 1994, ISBN 94-69309.

Mills, M. (Mar. 8, 1996) "Freebie Heebie-Jeebies: New Long-Distance Calling Via the Internet Scares Small Phone Firms", The Washington Post, sec. F, pp. 1-2.

Hughes, D.T. (Feb. 21, 1995) "What Hath (Net) God Wrought?", The Journal [Fairfax, Virginia], sec. B, pp. 1-2.

Hughes, D.T. (May 28, 1996) "WebPhone Heading for Serious Telephony", The Journal, [Fairfax, Virginia], sec. A, p. 8.

Mills, M. (Jan. 23, 1996) "It's the Net's Best Thing to Being There: With Right Software, Computer Becomes Toll-Free Telephone", The Washington Post, sec. C, pp. 1,5.

Yang, C. (Feb. 12, 1997), INETPhone: Telephone Services and Serves on Internet. http://ds.internic.net/rfc/rfc/rfc1789.txt.

Yang, C. (Feb. 12, 1997), INETPhone: Telephone Services and Serves on Internet. http://ds.internic.net/rfc/rfc/rfc1789.txt.

Margulies, Edwin (Aug. 1996) Understanding the Voice-Enabled Internet, Flatiron Publishing, Inc., pp. 4-42 and 12-1 to 12-3.

C. Low, "The Internet Telephony Red Herring," Hewlett-Packard Laboratories, (May 15, 1996), pp. 1-15.

C. Low et al., WebIN-an architecture for fast deployment of IN-based personal services, Intelligent Network Workshop, 1996, IN '96, IEEE, (Apr. 21-24, 1996), vol. 2, 196+258.

Noerpel et al., "PACS: Personal Access Communications System—A Tutorial," IEEE Personal Communications, Jun. 1996.

Varma et al., "Architecture for Interworking Data over PCS," IEEE Communications Magazine, Sep. 1996, 124-130.

Rosenberg et al., "SIP for Presence," 41st IETF, Apr. 3, 1998.

"Camelot Announces Internet Voice Communication Technology Breakthrough", HighBeamTM Encyclopedia, From: PR Newswire, http://www.encyclopedia.com/doc/1G1-16452259.html?Q=Caml, Feb. 13, 1995, 2 pages.

1979 Annual Technical Report, "A Research Program in Computer Technology", Oct. 1978-Sep. 1979, Prepared for the Defense Advanced Research Projects Agency, University of Southern California, ISI-SR-80-17.

Cohen et al., "A Network Voice Protocol NVP-11", Lincoln Laboratory Massachusetts Institute of Technology, Apr. 1, 1981, ISI/RR-83-23.

1982 Annual Technical Report, "A Research Program in Computer Technology", Jul. 1981-Jun. 1982, University of Southern California, ISI/SR-83-23.

Annual Report to the Defense Communications Agency, "Network Speech Systems Technology Program", Massachusetts Institute of Technology Lincoln Laboratory, Oct. 1, 1980-Sep. 30, 1981, issued Feb. 4, 1982.

Heggestad et al., "Voice and Date Communication Experiments on a Wideband Satellite/Terrestrial Internetwork System", IEEE International Conference on Communications, Integrating Communication for World Progress, Jun. 19-22, 1983.

Annual Report to the Defense Communications Agency, "Defense Switched Network Technology and Experiments Technology", Massachusetts Institute of Technology Lincoln Laboratory, Oct. 1, 1981-Sep. 30, 1982, issued Feb. 5, 1983.

Merritt, "Providing Telephone Line Access to a Packet Voice Network", University of Southern California, Feb. 1983, ISI/RR-83-107.

Weinstein, "The Experimental Integrated Switched Networks- A System Level Network Text Facility", Proceedings of 1983 IEE Military Communications Conference, Washington, DC, Oct. 31, 1983-Nov. 2, 1983.

Cesner et al., "Wideband Communications", 1984 Annual Technical Report, University of Southern California, ISI/SR-85-150, Jul. 1983-Jun. 1984.

Annual Report to the Defense Communications Agency, "Defense Switched Network Technology and Experiments Technology", Massachusetts Institute of Technology Lincoln Laboratory, Oct. 1, 1982-Sep. 30, 1983, issued Feb. 29, 1984.

Gross, "Proceedings of the Oct. 15-17, 1988 Joint Meeting of the Internet Engineering and Internet Architecture Task Forces", Fourth IETF, The Mitre Corporation.

Corley, "Bellsouth Trial of Wideband Packet Technology", Bellsouth Services, 1990 IEEE, CH2829-0/90/0000-1000.

Inoue et al., "Evolution Scenario of Broadband Services Based on Granulated Broadband Network Concept", IEEE Region 10 Conference, Tencon 92, Nov. 11-13, 1992.

Inoue et al., "Granulated Broadband Network Applicable to B-ISDN and PSTN Services", IEEE Journal on Selected Areas in Communications, vol. 10, No. 9, Dec. 1992.

Cerf et al., "A Protocol for Packet Network Intercommunication", IEEE Transactions on Communications, No. 8, May 1974.

Cole, "Dialing in the WB Network", Information Sciences Institute University of Southern California, Dialing-Cole.83, Apr. 30, 1981.

Hapgood, "Dialing Without Dollars", Jul. 1995, vol. 17, No. 4, pp. 18, Journal Code, INO.

Yang, "INETPhone: Telephone Services and Servers on Internet", Network Working Group, RFC 1798, Apr. 1995, http://ds.internic.net/rfc/rfc1798.txt.

Chen et al., "Integrated Voice/Data Switching", IEEE Communication Magazine, Jun. 1988, vol. 26, No. 6.

Frezza, "The Internet Phone is Poised to Conquer", Communications Week, Dec. 11, 1995, http://techweb.cmp.com/cw/current.

"Internet Access: Internet Phone-to-Phone Technology Now a Reality . . . ", Edge Publishing, Aug. 12, 1996.

"Internet Phone Saves 50% on Long Distance", 411 Newsletter, Aug. 5, 1996, vol. 17, No. 15, United Communications Group.

"Internet Phone Calls are Cheap but Limited", New Media Markets, Feb. 23, 1995, Financial Times Business Information, Ltd., ISSN:0265-4717.

"Internet Telephony Seems to be Evolving East, But is There Anyone on the Line?", Computergram International, Aug. 19, 1996, No. 2980, ISSN: 0268-716X.

"Internet's International Phone Calls are Cheap But Limited", Telecom Markets, Financial Times Business Information ID, Mar. 2, 1995, ISSN: 0267-1484.

Mills, The Washington Post, "Phone Service Via the Internet May Slash Rates", Aug. 11, 1996.

Sears, "The Effect of Internet Telephone of the Long Distance Voice Market", Jan. 14, 1995.

National Technical Information Service, Wideband Integrated Voice/Data Technology, ADA132284, Mar. 31, 1983, Massachusetts Inst. of Tech., Lexington, Lincoln Lab.

Detreville et al., "A Distributed Experimental Communications System", Advances in Local Area Networks, IEEE Press, 1987.

Borden et al., "Integration of Real-Time Services in an IP-ATM Network", Internet RFC/STD/FYI/BCP ARchives, Aug. 1995.

Laubach, "Classical IP and ARP over ATM" Hewlett-Packard Laboratories, Jan. 1994, http://www.faqs.org/rfc/rfc1577.txt.

Comer, "Internetworking with TCP/IP", vol. 1, Principles, Protocols, and Architecture, Department of Computer Sciences, 1995.

Perez et al., "ATM Signaling Support for IP Over ATM", Network Working Group, RFC 1765, Feb. 1995, http://www.ietf.org/rfc/rfc1765.txt.

Handley et al., "Session Invitation Protocol", Internet Engineering Task Force, draft-ieft-mmusic-sip-00, Feb. 22, 1996.

"Overview", NetSpeak Corporation, Apr. 8, 1997, printed from Edgar Online.

"NetSpeak Corporation to Exhibit First Release of Voice Over IP, IP-to-PSTN Networking Products", Business Wire, Jun. 2, 1997.

Zellweger, Polle T., et al., "An overview of the etherphone system and its applications," Xerox Palo Alto Research Center, pp. 160-168, Apr. 1988.

Ng, L.J., et al., "Distributed architectures and databases for intelligent personal communication networks," Department of Electrical Engineering, U. of British Columbia, pp. 300-304, Feb. 1992.

Malyan, Andrew D., et al., "Network architecture and signaling for wireless Personal communications," IEEE Journal On Selected Areas in Communications, vol. 11, No. 6, pp. 830-841, Aug. 1993.

Malyan, Andrew D., et al. "A Microcellular Interconnection Architecture For Personal Communications Networks," Department of Electrical Engineering, University of British Columbia Vancouver, B.C., V6T 1W.5, Canada, pp. 502-505, Feb. 1992.

Bakre, Ajay, et al., "M-RPC: A Remote Procedure Call Service for Mobile Clients," Department of Computer Science Rutgers, The State University of New Jersey Piscataway, NJ, p. p. 97-110, 1995.

O'Malley, Sean W., "A Dynamic Network Architecture," Department of Computer Science, University of Arizona, ACM Transactions on computer systems, vol. 10, No. 2, pp. 110-143, May 1992.

Cheshire, Stuart, et al., "Internet Mobility 4 by 4," SIGCOMM 96—Stanford, California, USA, pp. 1-2, Aug. 1996.

Chang, Rong N., et al., "A Service Acquisition Mechanism for the Client/Service Model in Cygnus," IBM Canada Laboratory Technical Report TR 74.059, pp. 323-345.

Arao, Shinya, et al., "Component-based policy deployment for service level differentiation in converging communication networks," IEEE, pp. 1388-1392, 1999.

Goya, Pawan, et al., "Integration of call signaling and resource management for IP telephony," IEEE Network, pp. 24-32, May/Jun. 1999.

Delatore, J.P., et al., "The 5ESS switching system: Fatory system testing," AT+T Technical Journal, vol. 64, No. 6, Jul.-Aug. 1985.

Oran, Dave, "Dial plan mapping for voice-over-IP," Access Engineering, Apr. 11, 1996.

Getting started guide for Internet Phone release 4, http://www.vocaltec.com, 1993-1996 VocalTec Inc.

VocalTec desktop dialer version 3.0, User reference, http://www.vocaltec.com, 1997 VocalTec Ltd.

"Vocaltec's telephony gateway software captures 1996 product of the year honors from computer telephony magazine," Herzliya, Israel, Dec. 18, 1996, VocalTec, Ltd.

"Introduction to VTG," Northvale, NJ 07647, Tel. 201-768-9400, info@vocaltec.com.

Kahane, Opher, et al., "IMTC VoIP Forum Contribution." Subject: Call management agent system requirements function architecture and protocol, VoIP97-010, pp. 1-44, Seattle, Jan. 1, 1997.

Kahane, Opher, "Introduction to VocalTec's CMA system," Intelligent switching for a new era of telecom, Nov. 7, 1996.

Newton, Harry, "Newton's Telecom Dictionary," 22nd edition, pp. 728, 2006.

Braden, R., et al., "Resource ReSerVation Protocol (RSVP)—Version 1 Functional Specification," Network Working Group, pp. 1-224, Univ. of Michigan, Sep. 1997.

Keiser, Bernhard E., et al., "Digital Telephony and Network Integration," downloaded Jul. 1, 2008.

Boyle, Jim, et al., "The COPS (Common Open Policy Service) Protocol," http://www.ietf.orgiintemet-drafts/draft-ietf-rap-cops-07.txt, pp. 1-35, Aug. 16, 1999.

Bellamy, John, "Digital telephony," Dallas, TX, Oct. 1981.

Open and standardized—the world of IP Protocols, "H.323: The Leading Standard in Voice over IP," downloaded Jul. 1, 2008.

"Inside APPN—The Essential Guide to the Next-Generation SNA," IBM, International Technical Support Organization Raleigh Center, Raleigh, NC, Jun. 1997.

Friedes, A., et al. "Integrating the world through communications," IEEE ICC, vol. 1 of 3, Jun. 22-25, 1986.

Huitema, Christian, "Routing in the Internet," Prentice Hall, Englewood Cliffs, NJ, 1995.

Lucky, R.W., "Applications of communications theory," Fundamentals of digital switching, AT+T Laboratories, Second Edition, downloaded, Jul. 3, 2008.

Bellamy, John, "Digital telephony," Second Edition, Wiley Series in Telecommunications, downloaded, Jul. 3, 2008.

Stallings, William, "ISDN and Broadband ISDN with frame relay and ATM," Prentice Hall, Upper Saddle River, NJ, downloaded, Jul. 3, 2008.

GR-1298-CORE, AINGR: Switching Systems, Telcordia Technologies, Issue 10, Nov. 2004.

GR-2863-CORE, CCS Network Interface Specification (CCSNIS) Supporting Advanced Intelligent Network (AIN), Bellcore, Bell Communications Research, Issue 2, Dec. 1995.

GR-246-CORE, Telcordia technologies specification of signalling system No. 7, Telcordia Technologies, Issue 10, Dec. 2005.

GR-1280-CORE, Advanced intelligent network (AIN) service control point (SCP) generic requirements, Telcordia Technologies, Issue 1, Aug. 1993.

Morris, Christopher, Academic Press Dictionary of Science and Technology, Academic Press, downloaded, Jul. 3, 2008.

GR-1428-CORE, CCS Network Interface Specification (CCSNIS) Supporting Toll-Free Service, Bellcore, Issue 2, May 1995.

Mockapetris, P., "Domain names—concepts and facilities," Network working group, Nov. 1987.

Mockapetris, P., "Domain names—implementation and specification," Network Working Group, Nov. 1987.

Finseth, C "An access control protocol, sometimes called TACACS," Network Working Group, University of Minnesota, pp. 1-20, Jul. 1993.

Carrel, D., "The TACACS+ Protocol," Network Working Group, Cisco, Oct. 1996.

ITU-T, "Line transmission of non-telephone signals," Recommendation H.323, May 28, 1996.

Product releases webpage, VocalTec, info@vocaltec.com, Aug. 26, 1996.

Tutorial on "H.323," by The International Engineering Consortium, http://www.iec.org, pp. 1-30, downloaded, Jul. 3, 2008.

Everhart, C., et al., "New DNS RR Definitions," Network Working Group, University of Maryland, pp. 1-11, Oct. 1990.

Handley, M., et al., "SIP: Session Initiation Protocol," Network Working Group, The Internet Society, Mar. 1999.

Rosenberg, J., et al., "SIP: Session Initiation Protocol," Network Working Group, The Internet Society, Jun. 2002.

Brannen, Lynn, et al., "Next generation switch," MCI Telecommunications, May 16, 1997.

Shen, Yi-Shang, "Communications network with flexible call routing and resource allocation," MCI Invention Disclosure Form, Jan. 8, 1998.

Kahane, Opher, et al, "Call management agent system specification," VoIP Forum Technical Committee Contribution, Chicago, II, Aug. 14, 1996.

Pulver, Jeff, "The internet telephone tookit," Wiley Computer Publishing, New York, NY, 1996.

Haley, James E., "Pay-per-call blocking using LIDB," AIN Service Description, Bell Atlantic Easy Number Call Routing Service, Oct. 1996.

American National Standard for Telecommunications—Signalling System No. 7 (SS7)—Signalling Connection Control Part (SCCP), American National Standards Institue, Inc., ANSITI.112-1992, Oct. 26, 1992.

American National Standard for Telecommunications—Signalling System No. 7 (SS7)—Message Transfer Part (MTP), American National Standards Institue, Inc., Mar. 14, 1996.

American National Standard for Telecommunications—Signalling System No. 7 (SS7)—Signalling Connection Control Part (SCCP), American National Standards Institue, Inc., ANSITI.110-1992, Jun. 2, 1992.

Gasman, Lawrence, "Broadband networking," Van Nostrand Reinhold, Jun. 13, 1994.

Balkovich, Ed, et al., "Project clarity: First internal trial," Readiness Review, Bell Atlantic Confidential and proprietary, Jul. 21, 1997.

Grigonis, Richard "Zippy," "Computer telephony over the internet," CT and the 'Net, Mar. 1996.

Park, Myung Ah, et al., "Dial-up internet access service system with automatic billing mechanism," ICICS 1997, Electronics .and. Telecommunications Research Institute, pp. 148-151, Singapore, Sep. 9-12, 1997.

El-Gendy, Hazem, et al., "Computer-supported routing for intelligent networks and personalized wired communications," ICCS 1994, pp. 1027-1033, Aug. 1994.

"Audio and video over the internet," CT and the 'Net, Mar. 1996.

Malamud, Carl, et al., "Internet talk radio: Geek of the week," Mobile IP Networking, O'Reilly .and. Associates, Inc., transcript of interview, Nov. 1993.

McConnell, Brian, "How to build an internet PBX," Pacific Telephony Design, http://www.phonezone.com/ip-phone.htm, pp. 1-9, Oct. 28, 1996.

Sears, Andrew, "Innovations in Internet Telephony: The Internet as the Competitor to the POTS Network," Innovation in Internet Telephony: The Internet as the Successor to the POTS Network, pp. 1-6, Feb. 28, 1996.

"Supercharging the web with computer telephony," CT and the 'Net, Mar. 1996.

Anand, Surinder S., et al., "Accounting architecture for cellular networks," ICPWC '96, IEEE, pp. 184-189, 1996.

Karttunen, Jari, et al., "Cost structure analysis and reference model for Scaleable network services," The Institution of Electrical Engineers, pp. 1-9, 1996.

Jennings, Barbara J., "End-User Requirements for High-Integrity Directory," Sandia National Laboratories, Albuquerque, IEEE, pp. 1793-1796, 1996.

Botvich, D., et al., "On Charging for Internet Services provided over an A.TIVI network," IEEE, pp. 669-679, 1997.

Estrin, Deborah, et al., "Design Considerations for Usage Accounting and Feedback In Internetworks," downloaded, Aug. 19, 2008.

Li, Chung-Sheng, et al., ""Time-driven Priority" Flow Control for Real-time Heterogeneous Internetworking," IBM T. J. Watson .and. esearch Center, IEEE, pp. 189-197, 1996.

Edell, RJ., et al., "Billing users and pricing for TCP," IEEE Journal on Selected Areas in Communications, vol. 13, Issue 7, pp. 1162-1175, Sep. 1995.

Margulies, Ed, "CT's Cyberdate With the 'Net," Computer Telephony Periscope, pp. 28-29, Aug. 1996.

Inamori, Hisayoshi, et al., "Common Software Platform for Realizing a Strategy for Introducing the TMN," Network Operations and Management Symposium, vol. 2, pp. 579-589, Feb. 1998.

Rajan, R., et al., "A policy framework for integrated and differentiated services inthe Internet," Network, IEEE, vol. 13, Issue 5, pp. 36-41, Sep./Oct. 1999.

Louth, Nick, "MCI Communications Corp. vaults phone-data divide," Reuters Limited, News article, Jan. 29, 1998.

Eriksson, Hans, "MBONE: The Multicast Backbone," file.IIICI/Documents%20and%20Settings/ralbertJDesktopIMBONE%20The%20Multicast%20Backbone.htm (1 of 13)Mar. 7, 2008 4:06: 17 PM.

Macedonia, Michael R., et al., "MBone Provides Audio and Video Across the Internet," file:///CI/Documents%20and%20Settings/ralbert/Deskt...20Audio%20and%20Video%20Across%20the%20Internet.htm (1 of 13) Mar. 10, 2008 9: 34:00 AM.

Lapolla, Stephanie, "Net call centers, voice to merge," News, PC Week, Mar. 31, 1997.

Bohn, Roger, et al., "Mitigating the coming Internet crunch: multiple service levels via precedence," San Diego Supercomputer Center, Mar. 22, 1994.

Weiss, W., "QoS with differentiated services," Bell Labs Technical Journal vol. 3, No. 4, pp. 48-62, Oct.-Dec. 1998.

Hartanto, Felix, et al., "Policy-Based Billing Architecture for Internet Differentiated Services," Proceedings of IFIP Fifth International Conference on Broadband Communications (BC '99), Hong Kong, Nov. 10-12, 1999.

Mahadevan, I., et al., "Parallel Architectures, Algorithms, and Networks," (I-SPAN '99) Proceedings. Fourth InternationalSymposium, pp. 420-425, Jun. 23-25, 1999.

Schulzrinne, H., et al., "A Transport Protocol for Real-Time Applications," Network Working Group, Audio-Video Transport Working Group, pp. 1-151, Mar. 10, 2008.

Schulzrinne, H., "RTP Profile for Audio and Video Conferences with Minimal Control," Network Working Group, Audio-Video Transport Working Group, pp. 1-18, Jan. 1996.

Kim, Gary, "Talk is cheap voice over the internet," America's Network, pp. 34-39, Jul. 15, 1996.

Newton, Harry, "Notes from the field: The personal side of CT," 12 Computer Telephony, Jan. 1997.

Venditto, Gus, "Internet phones the future is calling," Internet World Magazine, Jun. 1996.

Crowcroft, Jon, et al., "Pricing internet services," Department of Computer Science, UCL, Gower Street, London, UK, pp. 1-16, downloaded, Aug. 19, 2008.

Newton, Harry, "Telephony Messaging on the Internet," http://www.dialogweb.com/cgi/dwclient?req=1205770063076 (1 of 5) Mar. 17, 2008 12:08:09 PM.

Maruyama, Katsumi, et al., "A Concurrent Object-Oriented Switching Program in Chill," 2460 IEEE Communications Magazine, Jan. 29, 1991, No. 1, pp. 60-68, New York.

Rajkumar, R., et al., "A resource allocation model for QoS management," Proceedings. The 18th IEEE Real-Time Systems Symposium (Cat.No. 97CB36172) p. 298-307, Dec. 2-5, 1997.

Weinrib, A., et al., "Decentralized resource allocation for distributed systems," IEEE Infocom '87. The Conference on Computer Communications. Proceedings. Sixth Annual Conference—Global Networks: Concept to Realization (Cat. No. 87CH2412-5) p. 328-36, M.

Shabana, Mohamed, et al., "Intelligent switch architecture," 8081 Proceedings of the National Communications Forum 42 Sep. 30, 1988, No. 2, Chicago, IL., pp. 1312-1319.

Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A.

Elixmann, Martin, et al., "Open Switching—Extending Control Architectures to Facilitate Applications," ISS Symposium, pp. 239-243, Apr. 23, 1995.

Chandra, P., et al., "Network support for application-oriented QoS," (IWQoS 98) 1998 Sixth International Workshop on Quality of Service, pp. 187-195, May 18-20, 1998.

Klein, Rachelle S., et al., "Minimax Resource Allocation With Tree Structured Substitutable Resources,"Operations Research, vol. 39, No. 2, pp. 285-295, Mar.-Apr. 1991.

Nyong, D., et al., "Resource based policies for design of interworking heterogeneous service networks," Interoperable Communications Networks, vol. 1, Nos. 2-4, pp. 571-580, 1998.

Kabay, S., et al., "The service node-an advanced IN services element," 8438 BT Technology Journal vol. 13 Apr. 1995, No. 2, pp. 64-72.

Mayer, Robert L., et al., "Service Net-2000: An intelligent network evolution," 8010 At.and.T Technical Journal 70 (1991) Summer, No. ¾, pp. 99-110, Short Hills, NJ.

Mills, Mike, "Phone service via the internet may slash rates," The Washington Post, A Section; p. A01, Sunday, Final Edition, Aug. 11, 1996.

Chapman, Martin, et al, "Overall Concepts and Principles of TINA," TINA-C, Version 1.0, Feb. 17, 1995.

Kahane, Opher, et al, "Call Management Agent System Specification," Voice over IP Forum Technical Committee in Chicago, Aug. 14, 1996.

Verjinski, Richard D., "PHASE, A Portable Host Access System Environment," IEEE, May 1989.

Verizon Services Corp., et al., v. Cox Fibernet Virginia, Inc., et al., Report of Herman J. Helgert, Ph.D., Exhibit D, downloaded, Aug. 21, 2008.

Verizon Services Corp., et al., v. Cox Fibernet Virginia, Inc., et al., Report of Herman J. Helgert, Ph.D., Exhibit E, downloaded, Aug. 21, 2008.

The Jeff Pulver Blog: Free World Dialup and Verizon's patent on "name translation," http://pulverblog.pulver.com/archives/006846.html, pp. 1-19, Apr. 23, 2007.

Lipoff, Stuart, "Operations Support System Framework for Data Over Cable Services," Data Over Cable Technical Reports, MCNS Holdings, L.P., Oct. 16, 1996.

Sinnreich, H., et al., "Interdomain IP communications with QoS, authorization and usage reporting," http:www.cs.columbia.edu/-hgs/sip/drafts/draft-sinnreich-sip-qos-osp, Feb. 2000.

Pan, Ping, et al., "Diameter: Policy and Accounting Extension for SIP," Internet Engineering Task Force, Internet Draft, pp. 1-17, Nov. 15, 1998.

Schulzrinne, Henning, et al., "Interaction of Call Setup and Resource Reservation Protocols in Internet Telephony," pp. 1-13, Jun. 11, 1999, downloaded, Aug. 21, 2008.

Rosen, E., et al., "Memo re: BGP/MPLS VPNs," Networking Group, pp. 1-25, Mar. 1999.

Waksberg, M., "Axe 10 and the Intelligent Network," Commutation .and. Transmission, No. 4, pp. 67-76, Dec. 1993.

Niitsu, Yoshihiro, et al., "Computer-aided stepwise service creation environment for intelligent network," NTT Communication Switching Laboratories, Tokyo, Japan, IEEE, pp. 454-458, 1992.

Morgan, Michael J., et al., "Service creation technologies for the intelligent network," At.and.t Technical Journal, Summer 1991.

Fujioka, Masanobu, et al., "Universal service creation and provision environment for intelligent network," XIII International Switching Symposium, Stockholm, Sweden, Proceedings vol. III, pp. 149-156, May 27-Jun. 1, 1990.

Moy, J., "OSPF Version 2," Network Working Group, Proteon, Inc., Jul. 1991.

Lantz, Keith A., "Towards a universal directory service," Operating Systems Review, vol. 20, No. 2, Apr. 1986.

Fang, Wenjia, "Building An Accounting Infrastructure for the Internet," Princeton University, IEEE, pp. 105-109, 1996.

Aidarous, Salah, et al., "The role of the element management layer in network management," 1994 IEEE Network Operations and Management Symposium, Feb. 14-17, 1994.

Gareiss, Robin, "Voice over the internet," Data Communications, pp. 93-100, Sep. 1996.

Bethoney, Herb, "HAHTSite Gives Pros Everything They Need," PC Week, p. 36, Mar. 10, 1997.

Kolarov, Aleksandar, et al., "End-to-end Adaptive Rate Based Congestion Control Scheme for ABR Service in Wide Area ATM Networks," IEEE International Conference on Communications, Seattle, Washington, pp. 138-143, Feb. 1995.

Chen, Larry T., et al., "ATM and Satellite Distribution of Multimedia Educational Courseware," 1996 IEEE International Conference on Communications, pp. 1133-1137, Jun. 23-27, 1996.

Civanlar, M. Reha, et al., "FusionNet: Joining the Internet .and. Phone Networks for Multimedia Applications," ACM Multimedia 96, pp. 431-432, 1996.

Cobbold, Christopher, et al., "Enhancement for Integrated Wireless Personal Communications over Metropolitan Area Networks," 1996 IEEE International Conference on Communications, pp. 1370-1376, Jun. 23-27, 1996.

Comer, Douglas E., "Internetworking With TCP/IP," 3rd ed., V. 1. Principles, protocols, and architecture, Prentice-Hall, Inc., 1995.

Mahadevan, I., et al., "Quality of service achitectures for wireless networks: IntServ andDiffServ models," http://ieeexplore.ieee.org/xpllabsprintf.jsp?arnumber==778974.and.page..., Aug. 6, 2002.

Ahmadi, H., et al., "NBBS Traffic management overview," IBM Systems Journal, vol. 34, No. 4, pp. 604-628, 1995.

Stoica, Ion, et al., "LIRA: An Approach for Service Differentiation in the internet," sponsored by DARPA under contract Nos. N66OO1-96-C-8528 and N00174-96-K-0002, and by a NSF Career Award under grant No. NCR-9624979. Additional support was provi.

Duan, Juan, et al., "Efficient Utilization of Multiple Channels between two Switches In ATM Networks," IEEE, pp. 1906-1911, 1995.

Ejiri, Masayoshi, et al., "For Whom the Advancing service/network management," IEEE, pp. 422-433, 1994.

Lee, Whay Chiou, et al., "Integrated Packet Networks With Quality of Service Constraints," Globecom, IEEE, pp. 8A.3.1-8A.3.5, 1991.

Elia, Carlo, et al., "Skyplex: Distributed Up-link for Digital Television via Satellite," IEEE Intelligent Network workshop IN, Melbourne, Australia, Apr. 21-24, 1996.

Ely, Tom, "The Service Control Point as a Cross Network Integrator," Bellcore, IEEE, pp. 1-8, 1996.

Mamais, G., et al., "Efficient buffer management and scheduling in a combined IntServand DiffServ architecture: a performance study," ATM, 1999. ICATM '99. 1999 2nd International Conference on, pp. 236-242, Jun. 21-23, 1999.

Baumgartner, F., et al., "Differentiated services: a new approach for quality of service in the Internet," Proceedings of Eighth International Conference on High Performance Networking, pp. 255-273, Sep. 21-25, 1998.

Sibal, Sandeep, et al., "Controlling Alternate Routing in General-Mesh Packet Flow Networks," SIGCOMM 1994, London, England, pp. 168-179, Aug. 1994.

Jajszczyk, A., et al., "Bringing information to People," IEEE INFOCOM '95, Proceedings, vol. 3, Apr. 2-6, 1995.

CT and the 'Net, "Webphone," Computer Telephony pp. 219-221, Mar. 1996.

Sisalem, Dorgham, et al., "The Network Video Terminal," IEEE Proceedings of HPDC-5, pp. 3-10, 1996.

Baumgartner, H., et al., "Middleware for a New Generation of Mobile Networks: The ACTS OnTheMove Project," http:// www.isoc.org/inet96/proceedings/a6/a6_3.htm, pp. 1-4, Apr. 14, 2008.

"Talk Talk," tele.com, pp. 68-72, Jun. 1996.

Kreller, Birgit, et al., "UMTS: A Middleware Architecture and Mobile API Approach," IEEE Personal Communications, pp. 32-38, Apr. 1998.

Low, Colin, et al., "WebIN—An Architecture for Fast Deployment of IN-based Personal Services," IEEE, 1996.

Grami, A., et al., "The Role of Satellites in the Information Superhighway," IEEE International Conference on Communications, pp. 1577-1581, Jun. 18-22, 1995.

Gupta, Ranabir, et al., "Technical Assessment of (T)INA—TMN—OSI Technology for Service Management Applications," IEEE Network Operations and Management Symposium, vol. 3, pp. 877-887, Feb. 14-17, 1994.

Inamori, Hisayoshi, et al., "Applying TMN to a Distributed Communications Node System with Common Platform Software," NTT Network Service Systems Laboratories, Tokyo, Japan, pp. 83-87, IEEE International Conference on Communications, Seattle, WA, Jun. 18.

Clark, David D., et al., "Supporting Real-Time Applications in an Integrated Services Packet Network: Architecture and Mechanism," COMM'92, MD, USA, pp. 14-26, Aug. 1992.

Peeren, Rene, "IN in the Hybrid Broadband Network The Intelligent Web," Presentation, Ericsson, IEEE 1996.

Jain, Surinder K., "Evolving Existing Narrowband Networks Towards Broadband Networks with IN Capabilities," Bellcore Intelligent Networks, IEEE, Apr. 22, 1996.

Matta, Ibrahim, et al, "Type-of-Service Routing in Dynamic Datagram Networks," Department of Computer Science, University of Maryland, pp. 992-999, IEEE 1994.

Yeager, Nancy J., et al., "Web Server Technology: The Advanced Guide for World Wide Web Information Providers," National Center for Supercomputing Applications, pp. 250, Morgan Kaufman Publishers, Inc., 1996.

Kishimoto, Ryozo, "Agent Communication System for Multimedia Communication Services," IEEE INFOCOM, Fifteenth Annual Joint Conference of the IEEE Computer and Communications Societies, pp. 10-17, Mar. 24-28, 1996.

Willebeek-LeMair, Marc H., "Videoconferencing over Packet-Based Networks," IEEE Journal on Selected Areas in Communications, vol. 15. No. 6, pp. 1101-1114, Aug. 1997.

Kumar, Vinay, "Internet Multicasting: Internet's Next Big Thing," ICAST Corporation, pp. 1-13, Sep. 23, 1997.

The Wall Street Journal article on: "MCI's New Service for Corporate Use Sets 1 Line for Net, Phone," pp. B16, Jan. 30, 1997.

Sharp, C.D., et al., "Advanced Intelligent Networks-now a reality," Electronics .and. Communication Engineering Journal, pp. 153-162, Jun. 1994.

Pezzutti, David A., "Operations Issues for Advanced Intelligent Networks," IEEE Communications Magazine, pp. 58-63, Feb. 1992.

Oppen, Derek C., et al., "The Clearinghouse: A Decentralized Agent for Locating Named Objects in a Distributed Environment," ACM Transactions on Office Information Systems, vol. 1, No. 3, Jul. 1983, pp. 230-253.

Rendleman, John, et al., "ATM Goes Into Orbit . . . While IP Gets Speedy in Space," Communications Week, Mar. 17, 1997, www.commweek.com.

Miller, Mark A., "Troubleshooting TCP/IP: Analyzing the Protocols of the Internet," M.and.T Books, pp. 365-389, 1992.

Platt, Richard, "Why IsoEthernet Will Change the Voice and Video Worlds," IEEE Communications Magazine, pp. 55-59, Apr. 1996.

Quicklook, "Internet By Stellite," 1 page, http://www.netsatx.net.

Rosalyn, Retkwa, "Telephone Politics," Internet World, Jun. 1996.

Schreyer, Oliver, et al., "Least Cost Call Routing—A Brilliant Application for Private IN," IEEE International Conference on Communications, vol. 2 of 3, Jun. 23-27, 1996.

Rodriguez Serrano, Inma, "Evolution of a Hybrid Fibre Coaxial Network for Multimedia Interactive Services," British Telecommunications Egineering, vol. 15, pp. 249-253, Oct. 1996.

Sunaga, Hiroshi, et al., "A Reliable Communication Switching Platform for Quick Service Provisioning," IEEE International Conference on Communications, Seattle, WA, Jun. 18-22, 1995.

Marketing materials re: Workshops on "Telephony on the Internet," to take place on Sep. 24-25, 1996, at The Drake Hotel, Chicago, Illinois.

Gralla, Preston, "How the Internet Works," Ziff-Davis Press, pp. 118-119, 1996.

Gralla, Preston, "How the Internet Works," Ziff-Davis Press, pp. 64-67, 1996.

Tsuchida, Hisazumi, et al., "Intelligent Dynamic Service Provisioning Architecture in the Multimedia Era," NTT Information and Communication Systems Laboratories, IEEE, pp. 1117-1122, 1996.

Low, Colin, "Integrating Communication Services," IEEE Communications Magazine, pp. 164-169, Jun. 1997.

Fridisch, M., et al., "Terminals for Accessing the Internet—The Internet Telephone," Alcatel Telecommunications Review, 4th Quarter, pp. 304-309, 1996.

Hurwicz, Michael, "Switched ATM is fast, but not that smart. Routed IP is smart, but not that fast. Why not combine them?," http://www.ipsilon.com/, Apr. 1997.

Diehl, Standford, "Data's New Voice," BYTE, Special Report, pp. 129-135, Sep. 1996.

Kahn, Jeffery, "Videoconferencing Debuts on the Internet," LBL, U.S. Department of Energy, Berkeley, California, University of California, Feb. 28, 1995.

Braun, Hans-Werner, et al., "A framework for flow-based accounting on the Internet," National Science Foundation (NCR-9119473), downloaded, Aug. 21, 2008.

Kelly, Katy, "Up to their laptops in packed powder: Mountaintop office keeps skiers in touch," USA Today, Final Edition, News, pp. 1A, Feb. 21, 1997.
Braun, Torsten, "Implementation of an Internet Video Conferencing Application over ATM," IBM European Networking Center, Heidelberg, Germany, IEEE, pp. 287-294, 1997.
Sclavos, Jean, et al., "Information Model: From Abstraction to Application," Telecom Paris, France, pp. 1-13, downloaded, Aug. 21, 2008.
Black, Uyless D., "OSI: A model for computer communications standards," Prentice-Hall, Inc., pp. 157-201, 1991.
Sriram, Kotikalapudi, et al., "Voice Packetization and Compression in Broadband ATM Networks," IEEE Journal on Selected Areas in Communications, vol. 9, No. 3, pp. 294-304, Apr. 1991.
Arango, Mauricio, et al., "Guaranteed Internet Bandwith," IEEE, pp. 862-866, Nov. 18, 1996.
Lapolla, Stephanie, "Seagate joins the backup vendors' enterprise forays," PC Week, The National Newspaper of Corporate Computing, vol. 13, No. 33, Aug. 19, 1996.
Harmer, Julie, et al., "Revised Requirements for Mobile-API-Interim deliverable," OnTheMove public project, pp. 1-44, Dec. 1996.
Schulzrinne, Henning, "Personal Mobility for Multimedia Services in the Internet," IDMS '96 (European Workshop on Interactive Distributed Multimedia Systems and Services), Berlin, Germany, pp. 1-18, Mar. 4-6, 1996.
Schulzrinne, "Simple Conference Invitation Protocol," Internet Engineering Task Force, pp. 1-19, Feb. 22, 1996.
Ash, G.R., et al., "Design and Optimization of Networks With Dynamic Routing," American Telephone and Telegraph Company, The Bell System Technical Journal, vol. 60, No. 8, pp. 1787-1820, Oct. 1981.
Prosecution history of U.S. Patent No. 6,332,023, Issued, Dec. 18, 2001.
The Phone Zone, an online reference cite and catalog of PC based telephony and networking solution for business, http://www.phonezone.com/index2.htm, Oct. 29, 1996.
"IDT's Net2Phone Launches Phone-to-Phone Technology Via The Internet," Press release, http://web.net2phone.com/about/press/releases/p2p.asp, Sep. 8, 1997.
"Vocaltec's telephony gateway—the ultimate internet telephony solution?," Computer Telephony, pp. 30, Sep. 1996.
Cheriton, David R., "Dissemination-Oriented Communication Systems: Final Report," ARPA contract No. DABT63-91-K-0001, Nov. 26, 1996.
Johnson, David B., "Scalable Support for Transparent Mobile Host Internetworking," Proceedings of the Ninth Annual IEEE Worshop on Computer Communications, pp. 1-10, Oct. 1994.
"Specifications of Signalling System No. 7," International Telecommunication Union, ITU-T Telecommunication Standardization Sector of ITU, Recommendation, Q.700, Mar. 1993.
"Integrated Services Digital Network (ISDN) 1.312," CCITT The International Telegraph and Telephone Consultative Committee, ITU International Telecommunication Union, Recommendation, I.312/Q.1201, Oct. 1992.
"Interface Recommendation for Intelligent Network CS-1," International Telecommunication Union, ITU-T Telecommunication Standardization Sector of ITU, ITU-T Recommendation Q.1218, Oct. 1995.
"Series Q: Switching and Signalling," Intelligent Network, International Telecommunication Union, ITU-T, Telecommunication Standardization Sector of ITU, Recommendation Q.1218—Addendum 1, Sep. 1997.
Imielinski, Tomasz, et al., "Mobile Wireless Computing: Solutions and Challenges in Data Management," Department of Computer Science, Rutgers University, downloaded, Oct. 22, 2008.
Balmer, R., et al., "A Concept for RSVP Over DiffServ," Institute of Computer Science and Applied Mathematics, University of Berne, Switzerland, http://www.iam.unibe.ch/~rvs, pp. 412-417, IEEE, May 2000.
Ziegler, Jr., K., "A Distributed Information System Study," IBM SYST J, vol. 18, No. 3, pp. 374-401, 1979.
Blake, S., et al., "An Architecture for Differentiated Services," Network Working Group, pp. 1-36, Dec. 1998.
Walters, Rob, "Computer Telephony Integration," Second Edition, Artech House, 1999.
IMTC Voice over IP Forum Service Interoperability Implementation Agreement, Draft 0.91, IMTC Voice over IP Forum Technical Committee, VoIP97-008, Jan. 13, 1997.
Braden, R., et al., "Integrated Services in the Internet Architecture: an Overview," Network Working Group, pp. 1-28, Jul. 1994.
Braun, Torsten, "Internet Protocols for Multimedia Communications," Part II: Resource Reservation, Transport, and Application Protocols, IEEE MultiMedia, pp. 74-82, Oct.-Dec. 1997.
Black, Uyless D., "Internet Telephony Call Processing Protocols," Prentice Hall PTR, www.phptr.com, 2001.
Briere, Daniel D., et al., "Internet Telephony for Dummies," 2nd Edition, IDG Books Worlwide, Inc., 1997.
Vin, Harrick M., et al., "Multimedia Conferencing in the Etherphone Environment," Xerox Palo Alto Research Center, IEEE, pp. 69-79, Oct. 1991.
Detti, Andrea, et al., "Supporting RSVP in a Differentiated Service Domain: an Architectural Framework and a Scalability Analysis," http://www-st.influ-dresden.de/elisa/, downloaded, Oct. 27, 2008.
Bernet, Yoram, "The Complementary Roles of RSVP and Differentiated Services in the Full-Service QoS Network," QoS Mechanisms, Microsoft, downloaded, Oct. 27, 2008.
Herzog, S., et al., "COPS Usage for RSVP," Network Working Group, pp. 1-15, Jan. 2000.
Sebestyen, Istvan, "What is the position of Q.2, Q.3/15 on Internet Telephony for the IMTC—VoIP Forum Meeting in Seattle," ITU Telecommunication Standardization Sector, Study Group 15, pp. 1-5, Dec. 5, 1996.
Daniele, M., et al., "Textual Conventions for Internet Network Addresses," Nework Working Group, pp. 1-16, Jun. 2000.
Handley, M., et al., "SIP: Session Initiation Protocol," Internet Engineering Task Force, pp. 1-30, Dec. 2, 1996.
Weinstein, Clifford J., "The Experimental Integrated Switched Network—a System-Level Network Test Facility," IEEE, pp. 449-456, Jan. 1983.
"Computer Telephony and the Internet," pp. 1-8, downloaded, Jul. 14, 2009.
Jitian, Xiao, et al., "Sharing Model of Netware Node Resources and Real-Time Scheduling," Mini-Micro Systems, vol. 16, No. 12, pp. 54-59, Dec. 1995.
Swinehart, D.C., et al., "Adding Voice to an Office Computer Network," IEEE Global Telecommunications Conference, San Diego, CA, Nov. 28-Dec. 1, 1983.
Gupta, Amit, "Resource sharing for multi-party real-time communication," Proceedings of the Fourteenth Annual Joint Conference of the IEEE Computer and Communication Societies (INFOCOM '95), pp. 1230-1237, 1995.
Kausar, Nadia, et al., "A Charging Model for Sessions on the Internet," IEEE, pp. 32-38, Apr. 1999.
Schutzrinne, Henning, "A comprehensive multimedia control architecture for the Internet," IEEE, pp. 65-76, Sep. 1997.
Tsaoussidis, V., et al., "A CORBA-based Application Service Middleware Architecture and Implementation," State University, of NY at Stony Brook, pp. 1-7, downloaded, Aug. 19, 2008.
Bernet, Y., et al., "A Framework for Differentiated Services," The Internet Society, pp. 1-35, Sep. 22, 1999.
Gleeson, B., et al., "A Framework for IP Based Virtual Private Networks," The Internet Society, pp. 1-62, Feb. 2000.
Yavatkar, Raj, et al., "A Framework for Policy-based Admission Control," Internet Engineering Task Force, pp. 1-19, Apr. 1999.
Ekstein, Ronnie, et al., "AAA Protocols: Comparison between Radius, Diameter and Cops," Internet Engineering Task Force (IETF), pp, 1-17, Aug. 1999.
Hussmann, H., et al., "An edge device for supporting internet integrated services over switched ATM networks," pp. 1-10, downloaded, Aug. 19, 2008.
Sinnreich, H., et al., "Interdomain IP communications with QoS, authorization and usage reporting," http:www.ietf.org/internet-drafts..., Jan. 2000.
Mascolo, Cecilia, et al., "An XML based Programmable Network Platform," Dept. of Computer Science, University College London, pp. 1-5, Jun. 10, 2005.

Kumar, Vijay P., et al., "Beyond Best Effort: Router Architectures for the Differentiated Services of Tomorrow's Internet," IEEE Communications Magazine, pp. 152-164, May 1998.

Pan, Ping, et al., "Diameter-SIP," Internet Draft, pp. 1-15, Nov. 15, 1998.

Neilson, Rob, et al., "A Discussion of Bandwidth Broker Requirements for Internet2 Qbone Deployment," Internet2 Qbone BB Advisory Council, Version 0.7, pp. 1-30, Aug. 1999.

Stojsic, Goran, et al., "Formal Definition of SIP Proxy Behavior," IEEE, pp. 289-292, Feb. 2001.

Bhuyan, L., et al., "Impact of switch Design on the Application Performance of Cache-Coherent Multiprocessors," Dept. of Computer Science, Texas A.and.M University and Intel Corp., pp. 1-9, Nov. 15, 2005.

Product Overview, "IP Highway product overview," http://iphighway.com/prod/, pp. 1-4, Sep. 22, 1999.

Rosenberg, Jonathan, et al., "Internet telephony gateway location," IEEE, pp. 488-496, Feb. 1998.

Wright, S., et al., "IP "Telephony" vs. ATM: What is There to Discuss?," IEEE, pp. 400-409, Feb. 1998.

Wedlund, Elin, et al., "Mobility support using SIP," WoWMoM, Jan. 1999.

Aiken, B., et al., "Network Policy and Services: A report of a Workshop on Middleware," Network Working Group, pp. 1-26, Feb. 2000.

Aspnes, James, et al., "On-Line Routing of Virtual Circuits willi Applications to Load Balancing and Machine Scheduling," pp. 486-504, Journal of the ACM, vol. 44, No. 3, May 1997.

Salsano, Stefano, et al., "QoS Control by Means of COPS to Support SIP-Based Applications," IEEE Network, Mar./Apr. 2007.

White, Paul P., "RSVP and Integrated Services in the Internet: A Tutorial," IEEE Communications Magazine, pp. 100-106, May 1997.

Beck, Christopher J., et al., "Scheduling alternative activities," http://www.aaai.org/home.html, 1999.

Flykt, P., et al., "SIP Services and Interworking IPv6," 3G Mobile Communication Technologies, Mar. 26-28, 2001, Conference Publication No. 477.

Schulzrinne, Henning, et al., "Signaling for internet telephony," Columbia University, Dept. of Computer Science Technical Report CUCS-005-98, Feb. 2, 1998.

Barzilai, Tsipora, et al., "Design and Implementation of an RSVP-based Quality of Service Architecture for Integrated Services Internet," IEEE, May 1997.

Hubaux, Jean-Pierre, et al., "The impact of the Internet on telecommunication architectures," Computer Networks 31 (1999).

Roberts, Erica, "The New Class System," http://www.data.com/roundups/class_system.html, pp. 1-14, Sep. 22, 1999.

Wroclawski, J., "The Use of RSVP with IEFT Integrated Services," ftp://ftp.isi.edu/in-notes/rfc2210.txt, Sep. 22, 1999.

Sloman, Morris, et al., "Distributed Management for the Networked Millennium," Proceedings of the Sixth IFIP/IEEE International Symposium on Integrated Network Management—Boston, MA, U.S.A., May 24 -28, 1999.

Schulzrinne, Henning, "MIME-Version: 1.0," email communication dated Oct. 10, 1995.

Garrahan, James J., et al., "Marching toward the global intelligent network," IEEE Communications Magazine, vol. 31, No. 3, pp. 30-36, Mar. 1993.

Gys, L, et al., "Intelligence in the Network," Alcatel Telecommunications Review, pp. 13-22, 1st Quarter 1998.

Yang, C., "INETPhone Telephone Services and Servers on Internet," Network Working Group, pp. 1-6, Apr. 1995.

Perret, Stephane, et al., "MAP: Mobile Assistant Programming for Large Scale Communication Networks," IEEE, pp. 1128-1132, Apr. 1996.

Plunkett, Bill, "ISCP Service Capacity Improvements," Bellcore, Feb. 29, 1996.

Murray, Dave, "High speed signalling link interface for ISCP version 6.0," Bellcore, Feb. 29, 1996.

Evans, Jeff, "Alternative Approaches for Multi-ISCP Locator," Bell Atlantic, Mar. 13, 1996.

Performance Task Force, "Off-Line Engineering Tool," Bellcore, Sep. 3, 1996.

Jones, Doug R., "Advanced intelligent network delivering control of network routing," Bell Atlantic, downloaded, Aug. 20, 2008.

Gorton, Dave, "ISCP Evolution overview," Telcordia Technologies Inc., Jun. 5, 2001.

Brown, Kathryn C., "Telecom Convergence," PowerPoint presentation, downloaded Aug. 21, 2008.

Cohen, Danny, "Specifications for the Network Voice Protocol (NVP)," http://www.rfc-archive.org/getrfc.php?rfc=741, Nov. 22, 1977.

Low, Colin, "The Internet Telephony Red Herring," Hewlett Packard, pp. 1-15, May 15, 1996.

De la Fuente, L.A., et al., "Application of the TINA-C Management Architecture," Bellcore, Red Bank, NJ, downloaded, Aug. 21, 2008.

Finseth C. "An access control protocol, sometimes called TACACS," Network Working Group, University of Minnesota, pp. 1-21, Jul. 1993.

Buchanan, Ken, et al., "IMT-2000: Service Provider's Perspective," IEEE Personal Communications, pp. 8-13, Aug. 1997.

Pontailler, Catherine, "TMN and New Network Architectures," IEEE Communications Magazine, pp. 84-88, Apr. 1993.

* cited by examiner

TELEPHONE SERVICE VIA NETWORKING

RELATED APPLICATIONS

This is a continuation of U.S. patent application Ser. No. 09/441,565, filed Nov. 17, 1999, now U.S. Pat. No. 6,711,241, titled "Internet Telephone Service," which is a continuation of U.S. patent application Ser. No. 08/670,908, filed Jun. 26, 1996, now U.S. Pat. No. 6,069,890, titled "Internet Telephone Service," all of which are incorporated herein by reference. This application is related to U.S. patent application Ser. No. 08/698,713, filed Aug. 16, 1996, now U.S. Pat. No. 6,125,113, titles "Internet Telephone Service," which is a continuation-in-part of U.S. patent application Ser. No. 08/634,543, filed Apr. 18, 1996, now U.S. Pat. No. 6,438,218, titled "Internet Telephone Service," which applications are incorporated herein in their entirety. This application is also related to U.S. patent application Ser. No. 08/598,767, filed Feb. 9, 1996, now U.S. Pat. No. 6,218,858, titled "Analog Terminal Internet Access," and U.S. patent application Ser. No. 08/598,769, filed Feb. 9, 1996, now U.S. Pat. No. 6,285,745, titled "Analog Terminal internet Access."

TECHNICAL FIELD

The present invention relates to methods and system structures for providing public and private telephone service over the Internet and more particularly relates to providing such services through the public telecommunications system including over existing copper telephone lines.

BACKGROUND

Attention recently has been directed to implementing voice telephone service over the worldwide network now commonly known as the Internet. The Internet had its genesis in U.S. Government (called ARPA) funded research which made possible national internetworked communication systems. This work resulted in the development of network standards as well as a set of conventions for interconnecting networks and routing information. These protocols are commonly referred to as TCP/IP. The protocols generally referred to as TCP/IP were originally developed for use only through Arpanet and have subsequently become widely used in the industry. TCP/IP is flexible and robust, in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. It is presently estimated that the growth of the Internet is at a more or less annual doubling rate.

Referring to FIG. 1 there is shown a simplified diagram of the Internet. Generally speaking the Internet consists of Autonomous Systems (AS) which may be owned and operated by Internet Service Providers (ISPs) such as PSI, UUNET, MCI, SPRINT, etc. Three such AS/ISPs are shown in FIG. 1 at 10, 12 and 14. The Autonomous Systems (ASs) are linked by Inter-AS Connections 11, 13 and 15. Information Providers (IPs) 16 and 18, such as America Online (AOL) and Compuserve, are connected to the Internet via high speed lines 20 and 22, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP is using UUNET as an ISP. Other information providers, such as universities, are indicated in exemplary fashion at 24 and are connected to the AS/ISPs via the same type connections here illustrated as T1 lines 26. Corporate Local Area Networks (LANs), such as those illustrated in 28 and 30, are connected through routers 32 and 34 and links shown as T1 lines 36 and 38. Laptop computers 40 and 42 are representative of computers connected to the Internet via the public switched telephone network (PSTN) are shown connected to the AS/ISPs via dial up links 44 and 46.

The Information Providers (IPs) constitute the end systems which collect and market the information through their own servers. Access Providers are companies such as UUNET, PSI, MCI and SPRINT which transport the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packets that constitute a message may not travel the same path depending on traffic load. However they all reach the same destination and are assembled in their original order in a connectionless fashion. This is in contrast to connection oriented modes such as frame relay and ATM or voice.

One or more companies have recently developed software for use on personal computers to permit two-way transfer of real-time voice information via an Internet data link between two personal computers. In one of the directions, the sending computer converts voice signals from analog to digital format. The software facilitates data compression dozen to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communication via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. Nos. 5,434,913, issued Jul. 18, 1995, and 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the internet protocol (IP).

DISCLOSURE OF THE INVENTION

Objects of the Invention

It is an object of the present invention to provide telephone service via the Internet to users of the public telecommunications network either with or without access to a computer and with or without separate telephone user access to the Internet.

It is another object of the invention to provide the general public with an economical and convenient telephone service via the Internet without requiring the possession of computing equipment or familiarity with the Internet or its methodology on the part of the user.

It is yet another object of the invention to provide the public with impulse access to the Internet for voice communications without requiring maintenance of a subscription to an Internet access service.

It is another object of the invention to provide the foregoing types of telephone service over the Internet via the public telephone network without the necessity of reliance on signaling systems of interexchange carriers.

It is yet another object of the invention to provide voice service over public telephone systems via the Internet where the use of the Internet is optional to the Telco and transparent to the customer.

It is another object of the invention to provide voice service over public telephone systems via the Internet from telephone to telephone, from telephone to computer, from computer to telephone, and from computer to computer.

It is still another object of the invention to provide the foregoing type services with billing capabilities based substantially on equipment and methodologies presently available in the public switched telephone network.

SUMMARY OF THE INVENTION

The invention constitutes a system and method for providing telephone type services over the internetwork commonly known as the Internet. Public switched telephone networks utilizing program controlled switching systems are arranged in an architecture with the Internet to provide a methodology for facilitating telephone use of the Internet by customers on an impromptu basis. Provision is made to permit a caller to set-up and carry out a telephone call over the Internet from telephone station to telephone station without access to computer equipment, without the necessity of maintaining a subscription to any Internet service, and without the requiring Internet literacy or knowledge. Calls may be made on an inter or intra LATA, region or state, nationwide or worldwide basis. Billing may be implemented on a per call, timed, time and distance or other basis. Usage may be made of common channel interoffice signaling to set up the call and establish the necessary Internet connections and addressing. Calls may be made from telephone station to telephone station, from telephone station to computer or computer to telephone station.

DESCRIPTION OF THE DRAWINGS

FIG. 5 shows in flow diagram form one mode of operation of the system of the invent on.

Referring to FIG. 2 there is shown a simplified block diagram of an Advanced-Intelligent Network (AIN) controlled Public Switched Telephone Network (PSTN) arranged in an architecture for implementing one proposed system for providing telephone services via the Internet. This system is explained in detail in the above referenced related application Ser. No. 08/934,543, which application is assigned to the assignee of the present application. While that system provides an elegant arrangement for providing such telephone service over the Internet it is believed that the instant invention provides an alternate system with advantages in the streamlining of the methodology and elimination of a need for extensive use of a common channel signaling network for implementation over long distances. The system of FIGS. 2 and 3 is here explained as background to understanding of the system and advantages of the present invention.

Referring to FIG. 2 there are shown two SSP capable central offices 50 and 52 which may be located in the same or different states and regions. These central offices are connected by trunks indicated at 54 and 55 to the PSTN indicated by a cloud 57. Each central office is connected by local Loops to subscribers customer premises equipment (CPE) such as telephone terminals 56 and 58. These may be basic instruments for providing Plain Old Telephone Service (POTS). The subscriber premises are also shown as having personal computers (PCs) 60 and 62 connected to the local loops via modems 64 and 66. The SSPs associated with the central offices 50 and 52 are connected by CCIS links to an STP which in turn may be connected to an ISCP. While the STP functionality is here shown as constituting a single STP it will be appreciated that this is for the purpose of simplicity only and that a hierarchy of STPs may be involved.

The central offices 50 and 52 is provided with an Internet Module indicated at 72 and 74 connected by T1 trunks 76 and 78. Alternatively the Internet Module hardware may be situated at the central office and associated with the switching system. The Internet Modules may be provided with SSP capabilities and connected into the CCIS network as indicated by the links to the illustrative STP 80. The SSPs serving the Internet Module are inter-connected with the central office SSPs and CCIS network as shown here by illustrative links 79 and 81. The Internet Modules may be linked for signaling purposes by conventional F links indicated at 82. The Internet Modules are connected to the Internet cloud by T1/T3 trunks 86 and 88.

Figure 1:
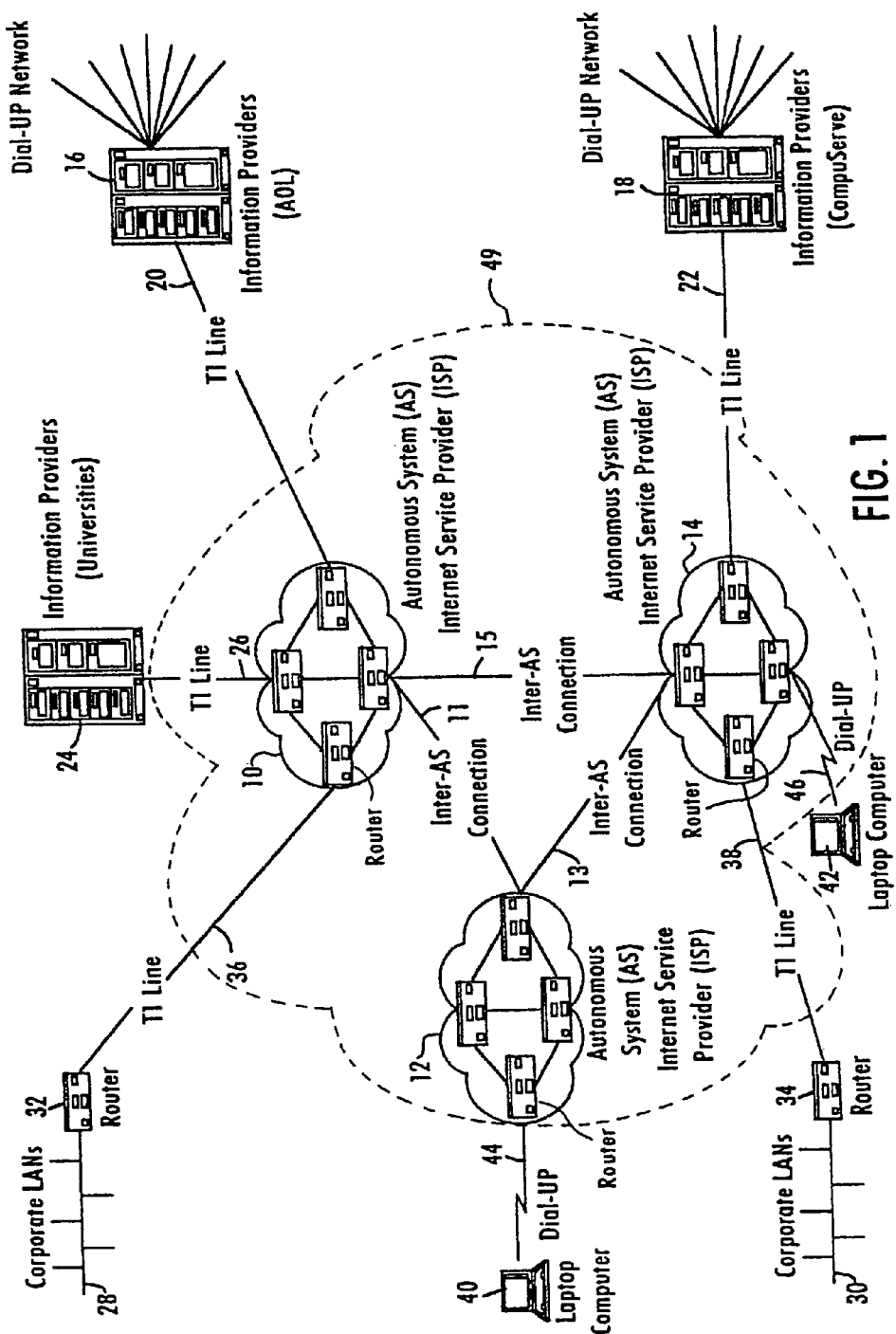
FIG. 1 is a simplified diagram of the Internet.
Figure 2:
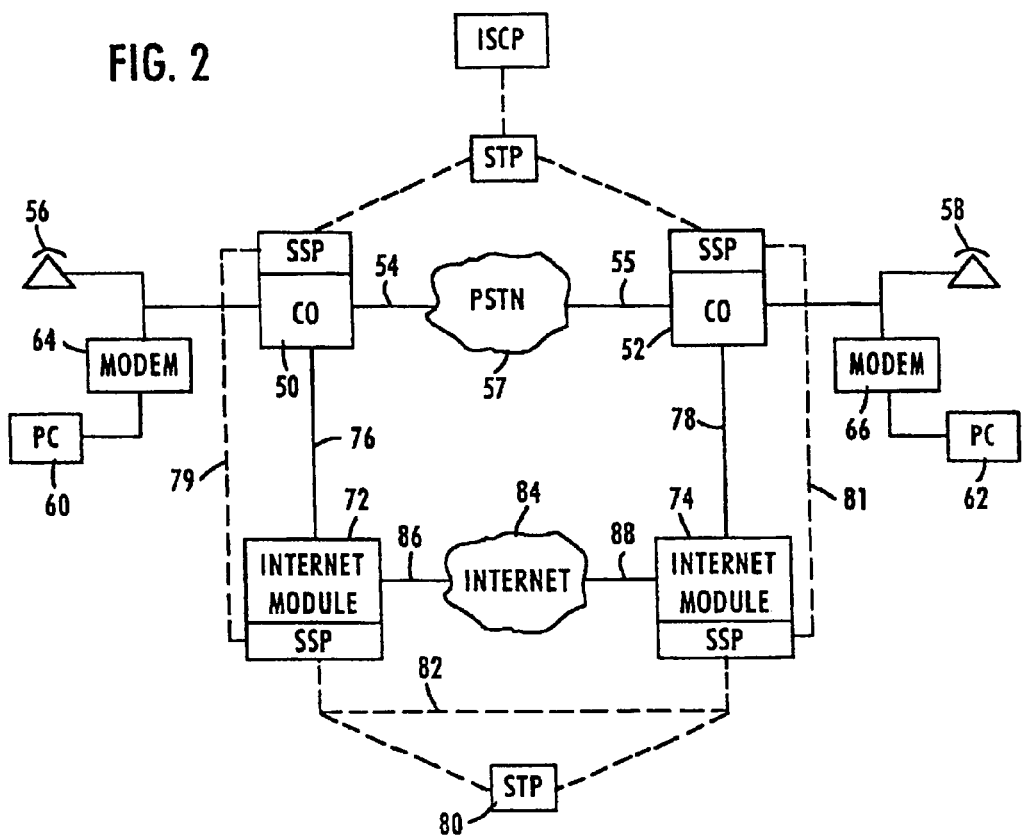
FIG. 2 shows the functional architecture of one proposal for providing an advanced form of telephone service via public switched telephone networks and the Internet using common channel interoffice signaling (CCIS) for establishing the telephone link.
Figure 3:
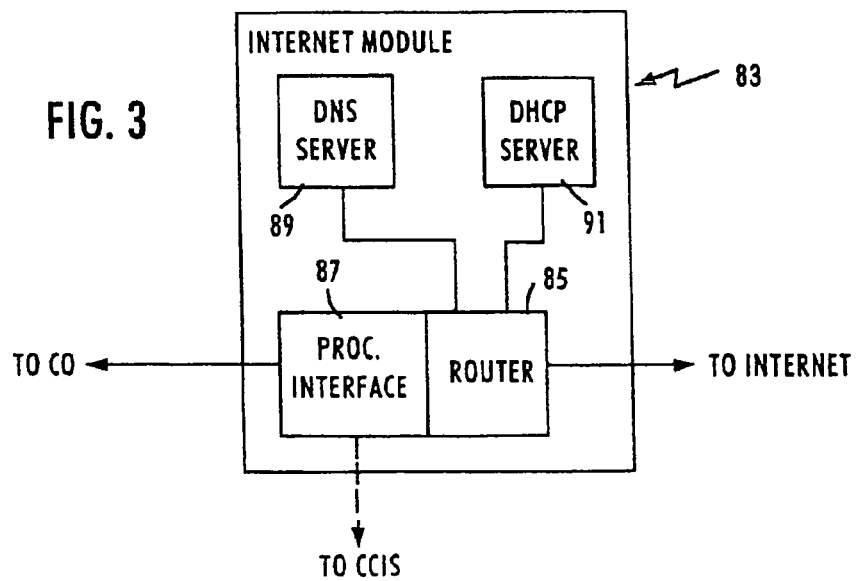
FIG. 3 shows in diagrammatic form the functional architecture of one embodiment of an Internet Module for use in the system illustrated in FIG. 2.

The functional architecture of one embodiment of an Internet Module for use in this system is shown diagrammatically in FIG. 3. The Internet Module, generally indicated at 83, includes a router 85 of the type now generally used in Internet practice, such as shown in FIG. 1. For performing some functions which may be utilized in the system of FIG. 2 the router may be provided with an interface with processing capability as illustratively shown at 87. Connected to the router are a Domain Name Service (DNS) server 89 and a Dynamic Host Configuration Protocol (DHCP) server 91 of the type conventionally used by Internet Service Providers in existing Internet Service. The router interface is connected to the central office and to the CCIS network while the router is connected to the Internet.

In the operation of the system of FIG. 2 an Internet connection is used to link a calling to a called telephone without the necessity of either party possessing or using personal or office computer equipment. The subscriber in this example uses the POTS station at 56 to initiate an Internet call to a called party at the POTS station 58. The caller goes off-hook and dials *82. This prefix has been established by the Telco offering the service as a predesignated prefix with which the public may initiate an Internet telephone call. The dialing of the prefix *82 is followed by the dialing of the directory number of the called party at the station 58.

The central office switching system responds to the off-hook and receives the dialed digits from the calling station. The central office switching system analyzes the received digits and determines from the prefix *82 that the call is an Internet call. Responsive to its programming it knows that the call must be completed through a remote central office and that further processing is necessary. At 106 the local or originating central office suspends the call and at 108 sends a CCIS query message through one or more of the STPs.

The query message goes to the central office to which the called station is connected. The receiving or destination central office receives the query and determines whether or not the called station at 58 is busy. If the called station is busy, the receiving central office so informs the originating central office. The originating central office provides a busy signal to the calling station.

If the called station is not busy, the receiving central office busies out the called station line by blocking all calls. The receiving or destination central office then informs the originating central office that the called line is available and waiting and that the processor in the Internet Module associated with the central office 52 is available.

An Internet virtual connection is then established between the calling and called stations. The receiving or destination central office provides a ringing signal to the called station and the originating central office sends ringback tone back through the local loop to the calling station at 122. When the called station goes off-hook and the Internet virtual connection is completed the conversation via the Internet can commence.

The set up of the Internet connection is as follows. When the originating central office receives from the destination central office the CCIS signal announcing that the called station is available and waiting, the originating central office may send a CCIS message to the Internet Module 72 and the processor interface 87 to the router 85. This message delivers the directory numbers of the calling station and the called station and requests establishment of an Internet connection (or virtual connection) between the two.

The processor interface and router may then react to receipt of that CCIS signal and request the temporary assignment of Internet addresses for the processors associated with the respective central offices. Upon completion of the assignment of the addresses the processor 87 may send a CCIS signal to the originating central office advising of that fact. This CCIS or SS7 communication between the originating central office and the originating Internet Module is indicated at 124. When the originating central office receives the message that the addresses have been assigned the switching system connects the originating local loop to the Internet Module 72.

As an alternative to this connection procedure the originating central office may establish the line or trunk connection to the Internet Module 72 immediately upon receipt of the CCIS signal indicating that the called station is available and waiting. In this alternative the originating central office then sends the directory numbers of the calling and called stations along with a request to establish an Internet connection or virtual connection between the two stations for a voice communication session either via the line or trunk connection to the Internet Module 72 or via the CCIS link to the Internet Module.

Following either of the foregoing procedures, the Internet Module router 85 in the Internet Module 72 sends a request for the assignment of temporary IP addresses for the two directory numbers to the DHCP server 91 as indicated at 128. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned. The originating Internet Module 72 next triggers a CCIS message to the destination Internet Module 74 which includes the temporary IP address assigned to the called directory number and associated processor.

As an alternative to the obtaining of an Internet address for the processor associated with the receiving central office at the originating central office switching system and its associated Internet Module the address may be obtained at the receiving central office switching system and its associated Internet Module and communicated to the originating central office switching system via the common channel signaling link.

Figure 7:
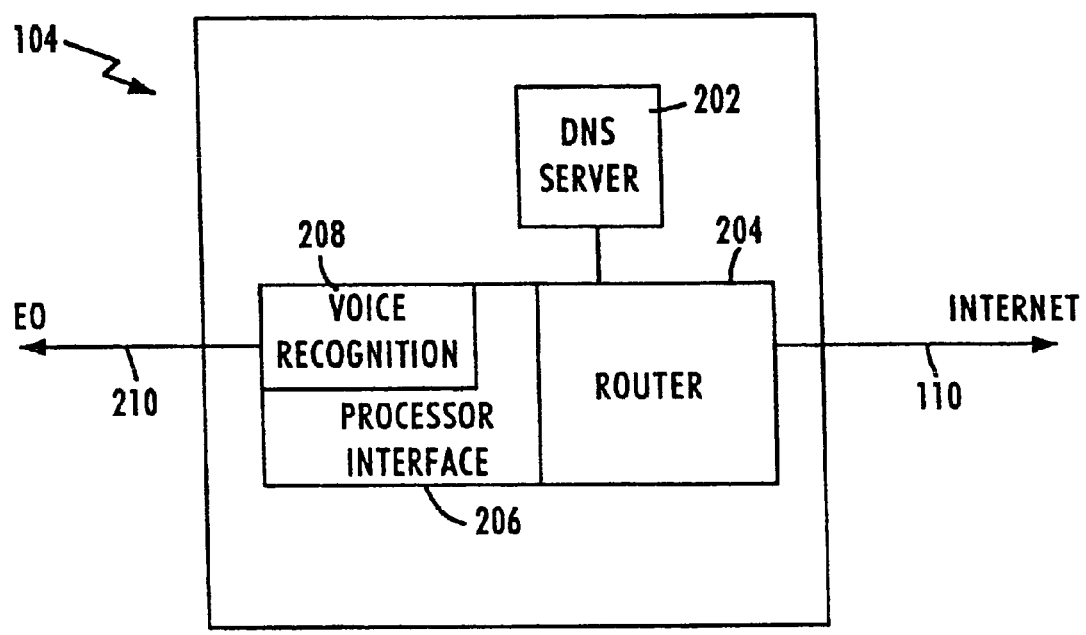
FIG. 7 shows in diagrammatic form the functional architecture of one embodiment of a gateway router module for use in operation of the system of the invention as described in connection with the flow chart of FIG. 6.

As the conversation commences the originating Internet Module 72 is receiving from the originating central office 50 over the trunk connection digitized speech in DS0 format. The Internet Module implements the function of a packet assembler and disassembler or PAD and assembles packets in TCP/IP format. The packets bear the source and destination IP addresses and the digitized speech payload. The packets are dispatched from the originating router 85 onto the Internet and are delivered to the destination router and Internet Module 74. The receiving router and associated processor have the directory number of the called party and the matching IP address which were obtained via CCIS signaling from the originating router as indicated at step 132 described hereinabove. The destination router and its processor interface perform the inverse function of the originating router and make the necessary translation of the TCP/IP packets to DS0 format which is delivered over the destination trunk to the destination central office. The switching system in that office converts the DS0 to analog and delivers the analog speech signal over the destination local loop to the destination telephone station 58. The responsive speech signal from the destination telephone station is processed in inverse fashion by the destination central office switching system and destination Internet Module and delivered to the Internet in TCP/IP format. The originating Internet Module and central office switching system also act in inverse fashion to deliver to the originating telephone station an analog voice signal. The packet exchange is indicated in FIG. 7 at 136.

Upon the establishment of the line/trunk connection to the Internet Module the originating central office may send billing information to the switch journal which indicates that an Internet call has been initiated and that may be recorded in the conventional manner.

Figure 4:
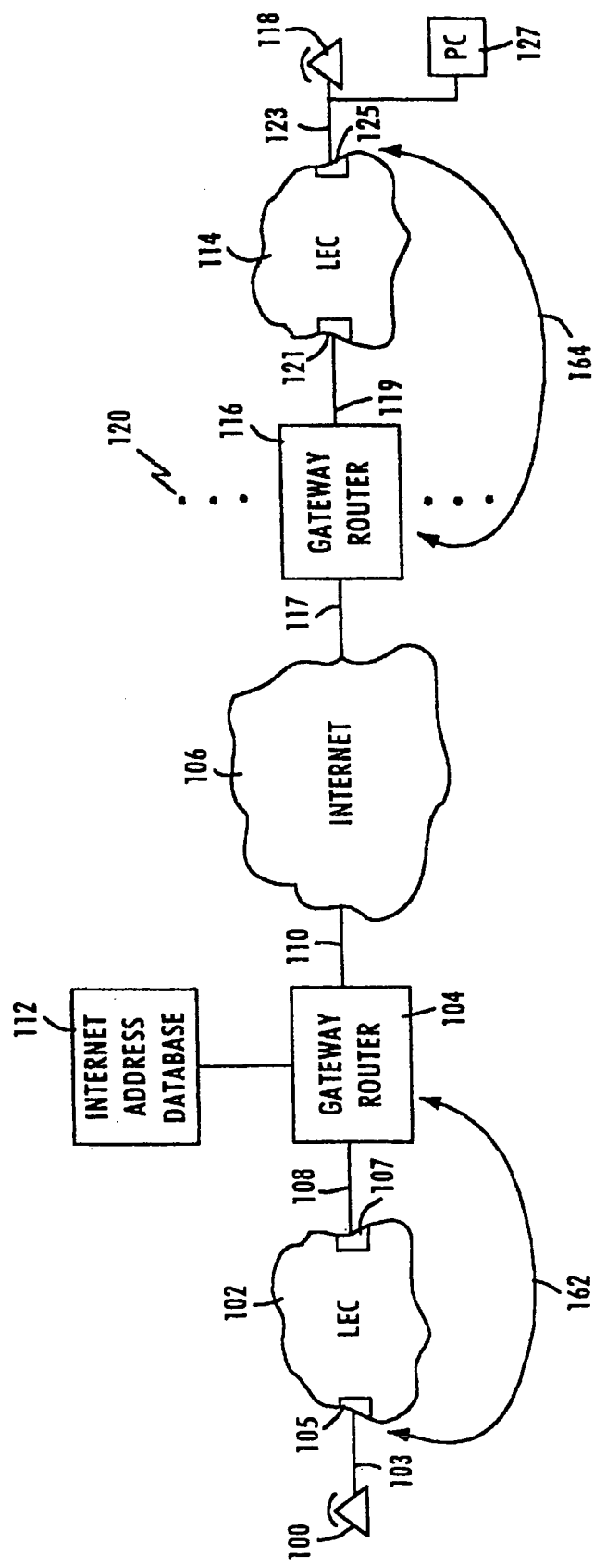
FIG. 4 shows in block diagram form the functional architecture of one embodiment of the present invention for providing telephone service via the Internet.

Referring to FIG. 4 there is shown a high level block diagram illustration of the architecture of one preferred embodiment of a system for implementing the present invention. A telephone 100 is connected to a Local Exchange Carrier (LEC) 102 by a conventional local loop 103 which normally would consist of a twisted pair to an end office 105. The Local Exchange Carrier or Telco may be either a Bell Operating Company (BOC) or an independent (e.g., GTE) which provide local transmission services. In order to provide telephone services according to the invention the LEC 102 is connected to a gateway router 104 which in turn is connected to the Internet 106. The gateway router 104 may be regarded as an ISP's gateway mechanism. The ISP may or may not be a part of the LEC. In a broad sense the gateway router 104 is equivalent to the router 85-87 shown in FIG. 3. The router 104 is connected to an end office switch 107 which is the exit from the LEC cloud 102. The connection between the router and end office switch may be a T1 trunk 108. The gateway router 104 is connected to the Internet cloud 106 by a T1/T3 trunk 110.

According to the invention the gateway router 104 is connected to an Internet address database indicated at 112. This database provides a limited form of telephone number to Internet address translation as will presently be described in further detail. While the database is shown as unitary at 112 it is to be understood that a hierarchical distributed database may be utilized in the manner described with respect to the DNS servers as described in connection with FIGS. 6 and 7. Alternatively the database may constitute a part of another database such as the storage provided in an ISCP or Intelligent Peripheral (IP).

FIG. 4 shows a second LEC 114 connected to the other side of the Internet 106 via a gateway router 116. These connections may be made via a T1/T3 trunk 117, T1 trunk 119, and end office 121. The LEC 114 serves subscriber telephones indicated by the illustrative telephone station 118 connected by local loop 123 to end office 125. While only a single gateway router 116 and LEC 114 are illustrated in FIG. 4 it will be understood that the LEC 114 is representative of a large number of LECs which connect to the Internet via ISP gateways throughout the United States and world. These gateways and LECs are indicated by the black dots 120.

The operation of the system illustrated in FIG. 4 may be briefly described as follows. A caller at the telephone 100 desiring to make an Internet telephone call may go off hook and dial *82. As explained in connection with the system illustrated in FIG. 2, this prefix has been established by the LEC offering the service as a predesignated prefix or unique identifier with which the public may initiate an Internet telephone call. Other unique identifiers such as off-hook or other triggers, PIN numbers or the like may also be used. The dialing of the prefix *82 is followed by the dialing of the directory number of the called party, i.e., the telephone station 118. The end office switching system 105 connected to the calling telephone 100 within the LEC 102 analyzes the received digits and determines from the prefix *82 that the call is an Internet call. Responsive to its programming it connects the call to the gateway router 104 identified as an Internet telephone call, and it sends the dialed digits constituting the telephone directory number of the called station 118 to the gateway 104. The gateway router 104 queries the Internet address database 112 for the Internet address of the destination gateway router, which in this case is the gateway router 116 serving the LEC 114 to which the destination or called telephone 118 is connected.

At this point it is desirable to review Internet addressing in connection with the system and method of the instant invention. Internet addresses (IP addresses) are unique 32 bit numbers (12 digits) assigned by the Internet network information center (InterNIC). Globally unique addresses permit IP networks anywhere in the world to communicate with each other. As previously explained, IP addresses consist of four groups of decimal numbers with values between 0 and 255. IP addresses are read from left to right, with the digits on the left normally is defining a network class and address, and the digits on the right defining a machine address on that network.

According to the invention, the Internet address database 112 reads the area code and NXX number of the dialed digits and extracts from its tables the IP address of the gateway router 116, which serves the called area and exchange via LEC 114. This IP address is delivered to the gateway router 104. The router uses the address to dispatch across the Internet 106 a TCP/IP packet which bears that IP address and which also includes the complete set of dialed telephone number digits identifying the called telephone station 118.

Figure 5:
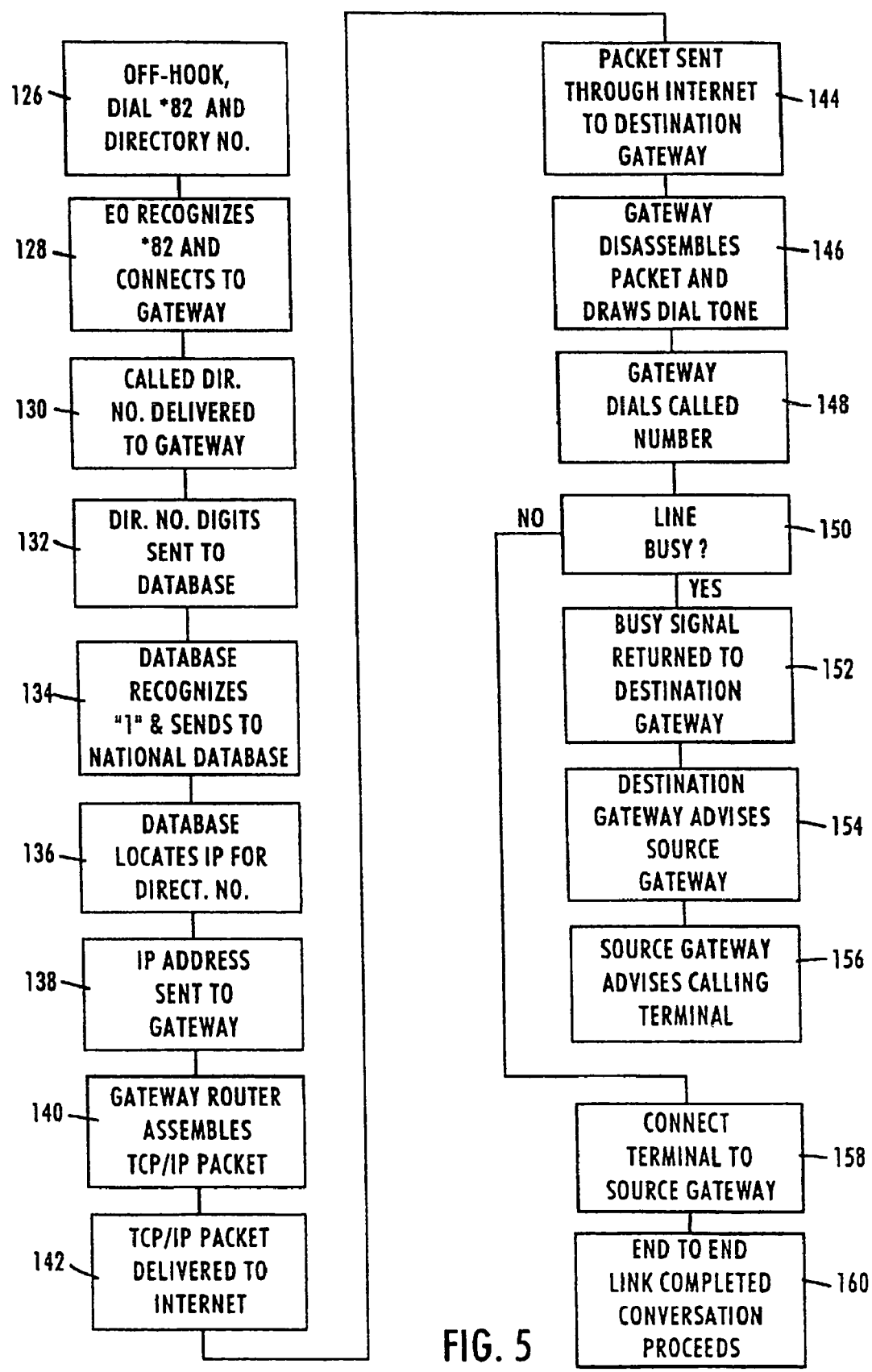

The destination gateway router 115 in turn delivers the information in that packet to the LEC 114. Since the information includes the complete telephone number of the telephone station 118, the LEC 114 is in command of all necessary data to connect to that station. This methodology permits the establishment of the call without requiring communication between the LECs 102 and 114 other than through the Internet, and without requiring the maintenance of a full global IP address database on the source end at 112. The operation of the system is now described in further detail in connection with the flow diagram presented in FIG. 5.

At 126 the telephone 100 goes off hook, receives dial tone from end office 105, and dials the Internet call prefix *82 followed by the telephone number of the called station. In this example, it will be assumed that the dialed telephone number is 1-415-555-1212. At 128 the end office switch 105 recognizes the prefix *82 as the Internet call prefix and may connect the call through end office 107 to the gateway router 104. The telephone number digits 1-415-555-1212 are delivered to the gateway router. This is indicated at 130. At 132 the gateway router forwards the digits 1-415-555 to the Internet address database 112. At 134 the database recognizes the national long distance prefix 1 and directs the database inquiry to that section containing national area codes and exchange numbers. If an international prefix or access code were to be used the search would be directed to the appropriate section of the database for international numbers. As previously stated, the database 112 may comprise a single database or preferably a distributed database in the manner of the well-known DNS database system.

At 136 the database conducts its search, locates the corresponding IP address. At 138 the IP address is delivered to the gateway router 104. As previously explained and with respect to the system illustrated in FIGS. 5 and 6, the router possesses processing and PAD capabilities. The functionality of gateway routers in handling TCP/IP routing is described by Bennett, "Designing TCP/IP Internetworks", Chapter 11 Van Nostrand Reinhold, 1995. At 140 the router 104 assembles a TCP/IP packet which includes the IP address received from the database 112 as well as the complete directory number 415-555-1212 for the telephone station 118, in addition to other data.

At 142 this packet is delivered to the Internet 106. At 144 the packet is routed through the Internet which uses the Internet address obtained from database 112 to deliver the packet to the addressed gateway router 116. At 146 the destination gateway router 116 disassembles the TCP/IP packet and draws dial tone from terminating end office 121 in LEC 114. At 148 the gateway router 116 dials the number 415-555-1212. At 150 the LEC 114 determines whether the local loop 123 and telephone 116 corresponding to that number are busy. If the line is busy a busy signal is returned to the gateway router 116 at 152. At 154 the gateway router receives that information, assembles an appropriate TCP/IP packet and dispatches the packet through the Internet addressed to the origination or source gateway router 104. At 156 the gateway router 104 disassembles that packet and sends an appropriate signal to the calling end office 105 and calling telephone 100.

If the called line 123 is not busy, a connection is established to that line through the LEC 114 to gateway router 116. This is indicated at 158. The end-to-end Internet telephone circuit or virtual circuit is now established and the conversation proceeds at 160.

The operation just described involves connecting both the source or calling gateway router 104 and the destination or called gateway router 116 to make the initial determination as to whether or not the called line is busy. As an alternative to this procedure, the gateway routers may be provided with SSP capabilities, as described in connection with FIGS. 2 and 3. In this case common channel signaling may be used at the originating end to defer connecting the source or calling gateway router 104 to the subscriber line 103 until such time as the availability of the called party is established. This feature is indicated diagrammatically in FIG. 4 at 162. Likewise, on the destination and a connection from gateway router 116 to line 123 may be deferred via common channel signaling until the availability of the line is established. This is indicated diagrammatically at 164. In either mode of operation when an originating trunk is assigned the billing may be implemented by the journal at the originating end office 105, which reads the trunk number and provides the conventional billing information to the revenue accounting office (RAO). The billing may be done either at a flat rate or on a timed basis. It will be obvious that the common channel signaling approach indicated at 162 and 164 is preferable for billing purposes as well as to minimize unnecessary equipment usage.

Figure 6:
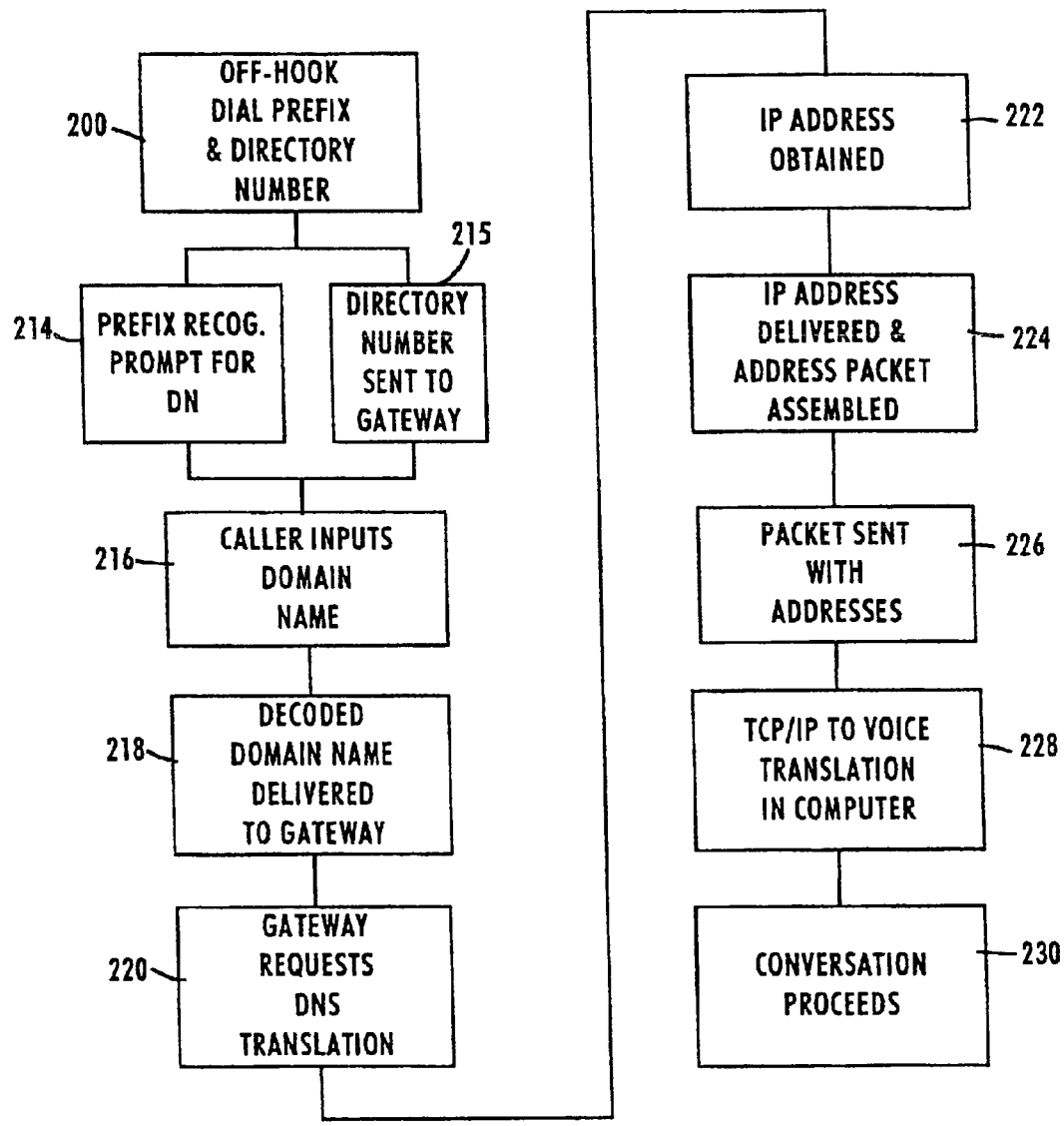
FIG. 6 shows in flow diagram form another mode of operation of the system of the invention.

Another mode of operation of the basic system of FIG. 4 is now described in relation to the simplified flow diagram of FIG. 6. This mode of operation is adapted to the situation where the called party has a customer premises equipment computer with voice capabilities and has an Internet domain or host name address. Such a computer is shown on 127 in FIG. 4.

As previously explained, the Telco offering the telephone service of the invention has established a prefix *82 for a telephone-to-telephone Internet call. According to the present embodiment, the Telco also establishes a second prefix *83 for voice communication from a telephone to a voice capable computer possessing an Internet address. Communication establishment is here commenced by the calling party at telephone station 100 going off hook and dialing the prefix *83, as indicated at 200 in FIG. 6. According to this embodiment of the invention the gateway router 104 is supplemented as shown in FIG. 7. As shown in that figure a Domain Name Service (DNS) server 202 is provided for the router 204. The router 204 is also provided with a processor interface 206 such as described in connection with FIG. 2. The processor interface in turn includes a voice recognition card 208. The processor interface is connected to the end office 107 at 210 and the router is connected to the Internet link 110.

Referring to the flow diagram of FIG. 6, at 212 the calling party at telephone 100 is connected to the gateway router shown in FIG. 7. As previously explained, this connection may be made responsive to the off hook and dialing of the prefix *83. In the alternative the connection may be made following CCIS signaling to establish the availability of the called line as indicated at 162 and 164 in FIG. 4.

At 214 the originating end office 105, having recognized the prefix *83 as requesting a telephone-to-computer voice communication issues a voice prompt to the calling party requesting the party to spell out the domain or host name of the called party. Simultaneously the originating end office alerts the gateway router that a domain or host name call has been initiated and sends the directory number of the calling party. This parallel step is indicated at 215. At 216 the caller responds to the voice prompt and sends the spoken domain name to the voice card. At 218 the digitized domain or host name address signal is delivered by the voice card and processor interface to the router 204.

At 220 the router requests a domain name translation from the DNS server 202. The DNS server provides the translation from the domain or host name supplied by the caller into a complete IP address at 222. Since each site maintains its own domain name server, no single site on the Internet is in possession of all of the translation data. The overall data constitutes a distributed database and relies on the servers at the individual sites. Access to the DNS is through a resolver and software library functions. The function in this case takes a domain name or host name and returns an IP address. The functionality also is capable of providing the inverse function of taking an IP address and returning a host name. Referring to FIG. 6 the full IP address is returned at 224.

The router and its processor interface assemble a TCP/IP packet containing the complete IP address of the called PC 127, the IP address of the source gateway router 104, and the directory number of the calling party, in addition to other information. At 226 this packet is dispatched through the Internet to the destination gateway router 116.

An alternative to the foregoing procedure may be implemented without the caller having knowledge of the computer address. However, this requires an Internet address database enlarged to include telephone number to complete IP address translations. This is to be contrasted to the smaller telephone number to IP address database wherein the IP address extends only to the address of the destination gateway routers as previously described. The enlarged database is necessarily distributed in the manner of the domain or host name servers described above.

In the example illustrated in FIG. 6 it has been assumed that the availability of the called party has been established and that the destination computer 127 is connected through the LEC to the destination gateway router 116. Since the destination computer is voice capable the destination gateway router 116 may deliver the TCP/IP protocol signal direct to the computer. The translation from TCP/IP to analog voice then occurs as a function of the voice card in the computer. This is shown in FIG. 6 at 228. The telephone-to-telephone, or computer speaker and microphone, has been completed and conversation back and forth may proceed between the telephone 100 and voice capable computer 127. This is indicated in FIG. 6 at 230.

While the computer 127 has been assumed to be "on" in the foregoing example, its availability may also be established by indicating an incoming computer telephone call using a distinctive ring signal. The called party hearing the ring signal is thereby alerted that the incoming call should be answered via the computer. In an analogous manner the computer may be placed in an on-line condition through a wake up signal in the form of signaling between ringing signals in a known manner. In a still further alternative, the incoming TCP/IP signal need not be converted to voice but may be presented as text in the manner an E-mail presentation. Such a presentation may be viewed in real time or may be stored for viewing at the convenience of the called party.

Figure 8:
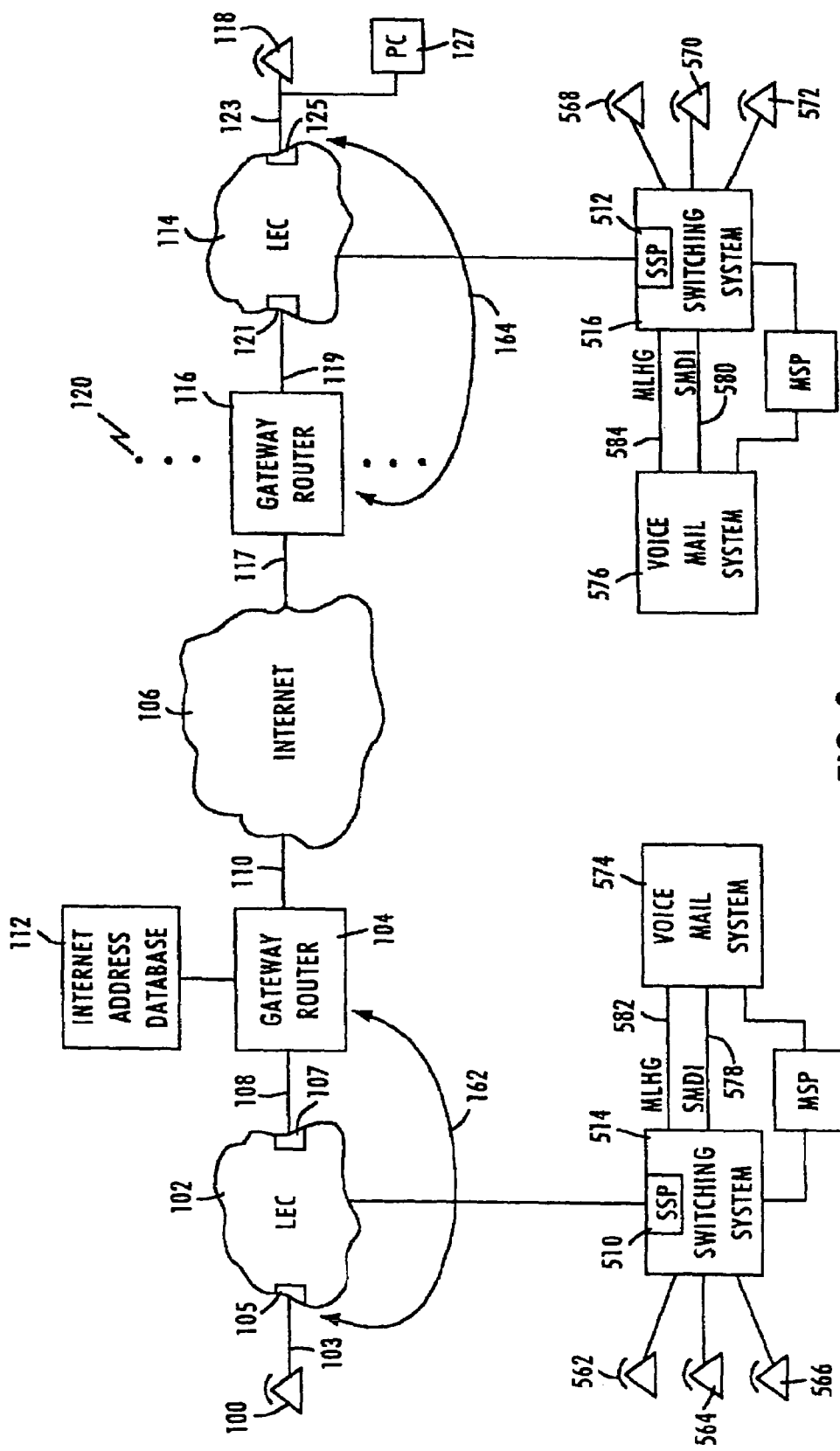
FIG. 8 shows a diagrammatic illustration of an architecture for providing voice mail service according to one embodiment of the invention.

The invention also comprehends and includes a mailbox type functionality where the retrieval as voice or text is at the option of the called party. The message may be deposited in the mailbox of the called party either as a result of a busy signal in an attempted telephone connection or an intentional deposit of a voice message without a desire to institute a real time voice connection. FIG. 8 provides a diagrammatic illustration of an architecture for providing this type of communication.

Figure 9:
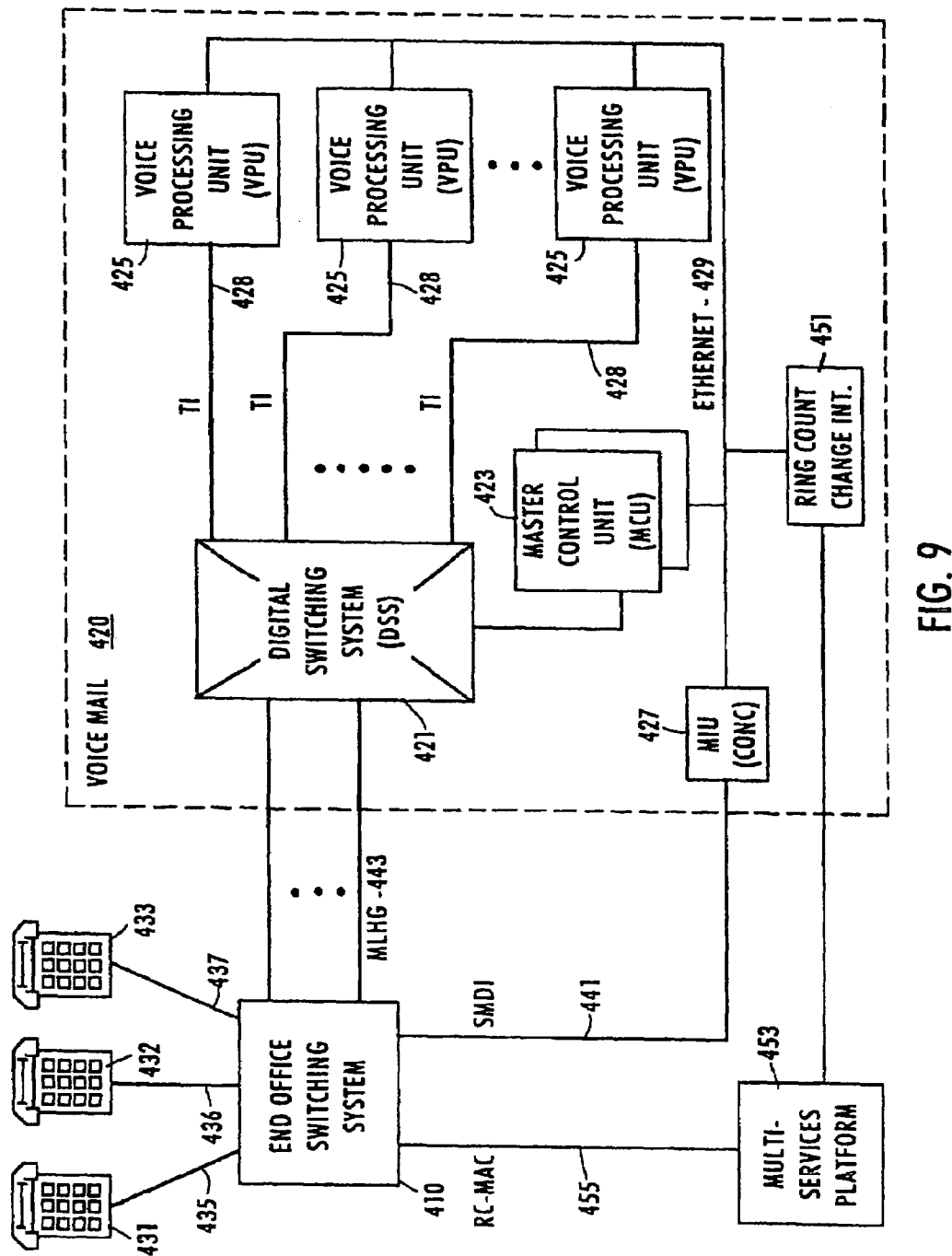
FIG. 9 shows a voice mail implementing communication system which may be used in the embodiment of the invention shown in FIG. 8.

FIG. 9 illustrates additional details of a voice mail implementing communication system which includes at least one switching system 410 and at least one centralized message service voice mail system 420. The switching system 410 may be a local or "end office" (EO) type telephone central office switch, such as a 1AESS or 5ESS switch sold by American Telephone and Telegraph.

The end office switching system 410 typically includes, among other components, a space or time division switching matrix, a central processing unit, an input/output device and one or more data communication units. A typical switch is described in further detail hereinafter in relation to FIG. 10. Structurally, the switching system 410 is a standard central office telephone switch. Each subscriber has at least one piece of customer premises equipment, illustrated as telephone station sets 431 to 433. Local telephone lines or loops 435 to 437 serve as communication links between each of the telephone station sets 431 to 433 and the end office switching system 410. Although shown as telephones in FIG. 9, the subscriber station equipment can comprise any communication device compatible with the line. Where the line is a standard voice grade telephone line, for example, the subscriber station equipment could include facsimile devices, modems, computers, etc.

The centralized message service or voice mail system in the illustrated example comprises voice messaging equipment such as a voice mail system 420. Although referred to as "voice" messaging equipment, equipment 420 may have the capability of storing messages of a variety of different types as well as voice messages. For example, a single system 420 may receive incoming messages in the form of audible messages, such as voice messages, as well as text format data messages. The voice messaging equipment 420 may also store messages in an image data format, such as facsimile. Message service systems having the capability to store messages in a variety of audible, data and image formats are known, see e.g., U.S. Pat. No. 5,193,110 to Jones et al., U.S. Pat. No. 5,008,926 to Misholi and U.S. Pat. No. 4,652,700 to Matthews et al.

The illustrated voice mail system 420 includes a digital switching system (DSS) 121, a master control unit (MCU) 423, a number of voice processing units (VPUs) 425 and a master interface unit (MIU) or concentrator 427. The master control unit (MCU) 423 of the voice mail system 420 is a personal computer type device programmed to control overall operations of the system 420.

Each of the voice processing units 425 also is a personal computer type device. The voice processing units 425 each include or connect to one or more digital mass storage type memory units (not shown) in which the actual messages are stored. The mass storage units, for example, may comprise magnetic disc type memory devices. Although not specifically illustrated in the drawing, the voice processing units 425 also include appropriate circuitry to transmit and receive audio signals via T1 type digital audio lines. To adapt the system 420 to receive information other than voice and/or offer services other than voice mail, one or more of VPUs 425 might be reprogrammed to run other types of applications and/or process other types of incoming information. For example, one such unit might process facsimile information, one might process E-mail, etc.

An ETHERNET type digital network 429 carries data signals between the MCU 423 and the voice processing units 425. The Ethernet network 429 also carries stored messages, in digital data form, between the various voice processing units 425. The system 420 further includes T1 type digitized audio links 428 between the DSS switch 421 and each of the voice processing units 425.

The voice mail system 420 connects to the switching system 410 via a number of simplified message desk interface (SMDI) type data lines 441. Specifically, these SMDI links 441 connect between one or more data units (not shown) in the end office switching system 410 and the MIU 427 in system 420. Each SMDI line 441 carries 2400 baud RS-232 data signals in both directions between the voice mail system 420 and the switching system 410. The MIU 427 is a data concentrator which effectively provides a single connection of as many as 32 SMDI lines into the MCA 423 of the voice mail system.

The voice mail system 420 also connects to the end office switching system 410 via a number of voice lines 443 which form a multi-line hunt group (MLHG) between the switch matrix within the switching system 410 and the DSS switch 421 of the voice mail system 420. Typically, the MLHG lines 443 consist of a number of T1 type trunk circuits which each carry 24 voice channels in digital time division multiplexed format.

The above described voice mail system architecture is similar to existing voice mail type central messaging systems, such as disclosed in U.S. Pat. No. 5,029,199 to Jones et al., although other messaging system architectures such as disclosed in the other patents cited above could be used.

For purposes of the present embodiment, the voice mail system 420, or other centralized messaging system, will further comprise a ring count change interface 451. The interface 451 connects to the Ethernet network 429 and provides two-way data communication between the network 429 in the voice mail system 420 and a multi-services platform (MSP) 453. For example, the unit 451 might provide a 9600 baud data channel over a line to the platform 453.

The interface 453 will receive packets of data over the Ethernet network 429 indicating changes in the status of the various subscribers' mailboxes. These packets of data will identify a particular subscriber and indicate the number a number of rings for future use in processing calls for that subscriber. The interface 453 forwards the ring count change data packets to the platform 453. The interface also receives data signals from the MSP 453, for example acknowledgements of transmitted data and/or signals indicating actual changes of status information by the switching system 410. In enhanced embodiments, the interface might include some data processing capabilities, as well. Also, the interface can provide instructions to change some other parameter of the call forwarding procedure, such as the subscriber's forwarding number.

The multi-services platform 453 connects to the end office switching system 410 via a recent change-memory administration channel (RC-MAC) 455. RC-MAC 455 is a data link to the processor of the switching system 410 for inputting data into the translation tables used by the switching system 410 to control switched communications operations with regard to each subscriber's line. The multi-services platform is a processor for receiving various service change instructions, including those from the interface 451 and from other sources, processing the instructions as necessary to make them compatible with switch programming, and forwarding instructions to the switching system 410 to change specific relevant translation table data stored in the switching system. In response to the change of status data from the ring count interface 451, the multi-services platform 453 provides appropriate data packet signals on the RC-MAC channel 455 to the end office switching system 110 to change a particular subscriber's ring count for forwarding on no answer. The instructions from the MSP 153 will identify a specific subscriber's line and will specify a ring count or ringing interval for use in determining when a call for that subscriber has gone unanswered and should be forwarded to the voice mail system 420. The multi-services platform may also forward instructions to change other parameters of the call forwarding function.

Operation via an RC-MAC channel to change data in a switching system relating to call forwarding is described in U.S. Pat. No. 5,012,511 to Hanle et al., the disclosure of which is incorporated herein in its entirety by reference. The multi-services platform 453 is the same as or substantially similar to a processor used in the patented system to process various translation memory change requests, both from RC-MAC terminals and a voice response unit.

Figure 10:
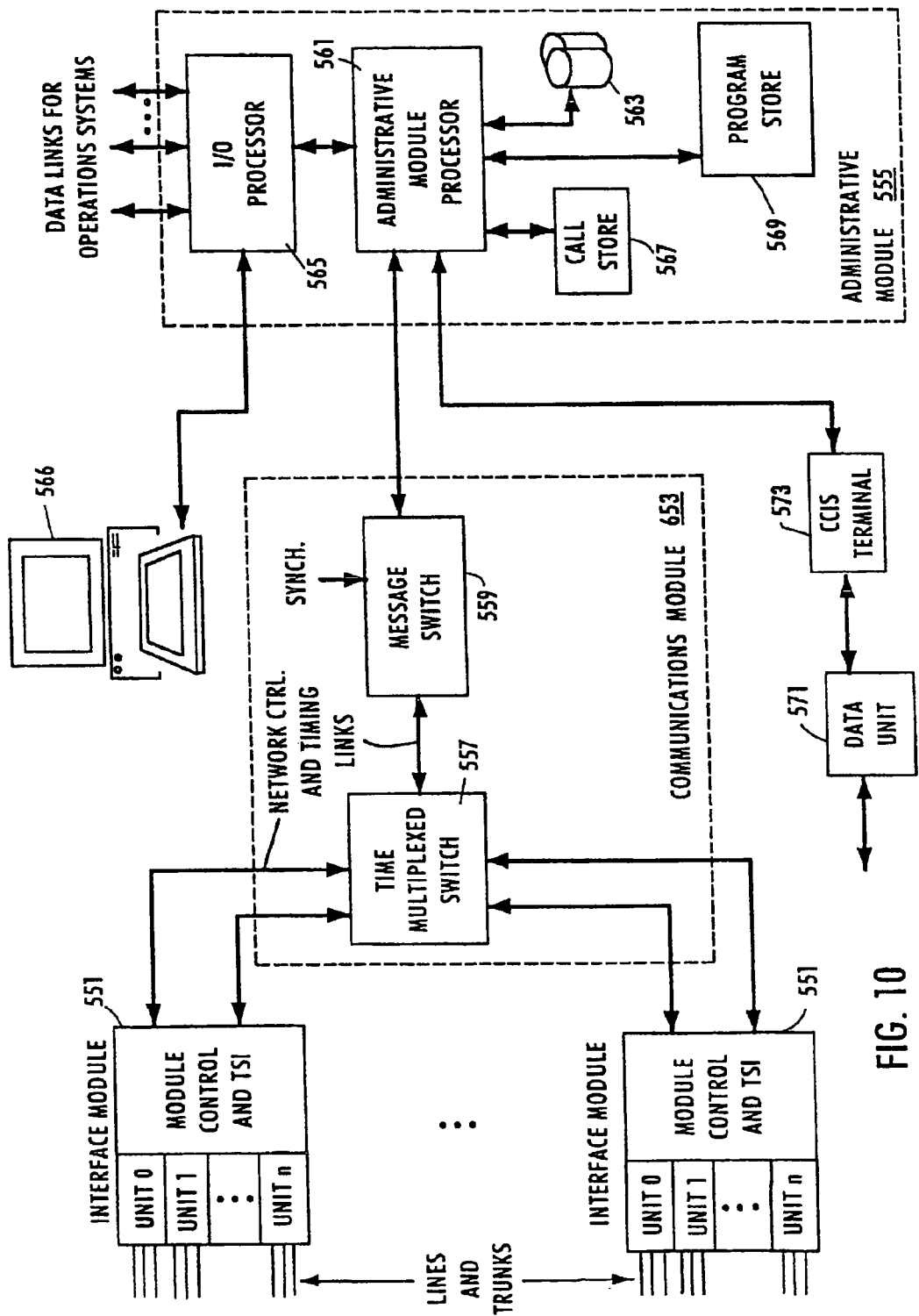
FIG. 10 shows a typical program controlled switch which may be used in the networks of the invention.

FIG. 10 is a simplified block diagram of an electronic program controlled switch which may be used as any one of the SSP type switching offices in the systems of FIG. 4 or 8. As illustrated, the switch includes a number of different types of modules. In particular, the illustrated switch includes interface modules 551 (only two of which are shown), a communications module 653 and an administrative module 555.

The interface modules 551 each include a number of interface units 0 to n. The interface units terminate lines from subscribers' stations, trunks, T1 carrier facilities, etc. Where the interfaced circuit is analog, for example a subscriber loop, the interface unit will provide analog to digital conversion and digital to analog conversion. The interface modules for the analog lines also include dial pulse detectors and dual tone multifrequency (DTMF) detectors. Alternatively, the lines or trunks may use digital protocols such as T1 or ISDN. Each interface module 551 also includes a digital service unit (not shown) which is used to generate call progress tones.

Each interface module 551 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 557 and thence to another interface module (intermodule call connection).

The communication module 653 includes the time multiplexed switch 557 and a message switch 559. The time multiplexed switch 557 provides time division transfer of digital voice data packets between voice channels of the interface modules 551 and transfers data messages between the interface modules. The message switch 559 interfaces the administrative module 555 to the time multiplexed switch 557, so as to provide a route through the time multiplexed switch permitting two-way transfer of control related messages between the interface modules 551 and the administrative module 555. In addition, the message switch 559 terminates special data links, for example a link for receiving a synchronization carrier used to maintain digital synchronism.

The administrative module 555 includes an administrative module processor 561, which is a computer equipped with disc storage 563, for overall control of operations of the switching office. The administrative module processor 561 communicates with the interface modules 551 through the communication module 555. The administrative module 555 also includes one or more input/output (I/O) processors 565 providing interfaces to terminal devices for technicians such as shown at 566 in the drawing and data links to operations systems for traffic, billing, maintenance data, etc. A CCIS terminal 573 and an associated data unit 571 provide a signaling link between the administrative module processor 561 and an STP of the SS7 signaling network, for facilitating call processing signal communications with other central offices (COs) and with one or more of the SCPs and/or the ISCP.

As illustrated in FIG. 10, the administrative module 555 also includes a call store 567 and a program store 569. Although shown as separate elements for convenience, these are typically implemented as memory elements within the computer serving as the administrative module processor 561. For each call in progress, the call store 567 stores translation information retrieved from disc storage 563 together with routing information and any temporary/information needed for processing the call. For example, for a switch based Centrex type service, the call store 567 would receive and store extension number translation information for the business customer corresponding to an off-hook line initiating a call. The program store 569 stores program instructions which direct operations of the computer serving as the administrative module processor.

Of particular note, the translation data in the disc storage 563 includes translation information needed to address messages for transmission through the signaling network. In particular, when the switch needs to send a message through the SS7 network to a particular node, the data from the disc storage 563 provides the global title and/or point code for the message destination.

Referring to FIG. 8 there is shown a diagram or another version of the Internet telephone communication network illustrated and described in connection with FIG. 4. The network in FIG. 8 includes a voice mail system associated with each of the LECs 102 and 114 and their end office switching systems 105 and 125. FIG. 8 shows two SSPs 510 and 512 which comprise end office switching systems 514 and 516 in the LECs 102 and 114 respectively. The end office 514 represents an end office in the LEC 102 and the end office 516 represents an end office in the LEC 114.

Each switching system 514 and 516 in this illustration comprises an end office and is connected to customer premises equipment, illustrated as telephone stations 562, 564, 566, 568, 570 and 572. Local telephone lines or local loops serve as communication links between each of the telephone stations and its end office switching system. It will be understood that the subscriber station equipment may also comprise other communication devices compatible with the line, such as facsimile devices, modems, computers, etc.

Each switching system 514 and 516 is also provided with a centralized message service or voice mail system shown in FIG. 8 as 574 and 576. These systems may be of the type illustrated and described in detail in connection with FIG. 9. Although referred to as voice messaging equipment, the systems 574 and 576 may have the capability of storing messages of a variety of different types as well as voice messages. For example, a single system may receive incoming messages in the form of audible messages such as voice messages, as well as text format data messages. The equipment may also store messages in an image data format such as facsimile.

The voice mail systems 574 and 576 connect to the switching systems 514 and 516 via SMDI data lines 378 and 380 and by multi-line hunt groups (MLHGS) 582 and 584. Typically, the MLHG lines consist of a number of T1 type trunk circuits which each carry 24 voice channels in digital time division multiplexed format.

The operation of the system shown in FIG. 8 according to one mode of the invention may be as follows:

A subscriber associated with telephone station 562 desiring to use the Internet to leave a voice message in the mailbox of a remote subscriber, such as the subscriber associated with telephone station 568, may use a telephone station to access his own voice mailbox in the voice mail system 574. This may be accomplished by dialing a number associated with the voice mail system 574 for this purpose. The desire to use the mailbox for an Internet communication may be signalled either by use of a unique prefix, as *84, or may be encoded into the number to be dialed to reach the mailbox for Internet communication purposes.

The voice processing unit of the voice mail system may operate its voice menu to direct the callers to depress a specified key when satisfied with the message in a known fashion. It may then query the caller as to whether he desired to send the message and, if so, to depress another specified key. The voice unit then will instruct the caller as to the procedure for keying in the telephone number identity of the destination and to depress a further specified key to send the message. The message is digitized in conventional fashion and stored in the mailbox of the sender. The caller may go on-hook after depressing the designated send key. The depression of the send key causes the generation of a tone or signal which is recognized by the SSP 510 as a trigger.

In response to the trigger, the SSP frames a TCAP inquiry message which is directed via one or more STP's to an ISCP for instructions. The TCAP message includes information identifying the calling station and mailbox and the called station and the fact that the caller is requesting mailbox-to-mailbox message transfer via the Internet. The ISCP consults its database to establish the existence and identity of a mailbox for the called number. If the identity of such a mailbox is found the ISCP then originates a response to the SSP 510. This response includes instructions to packetize and dispatch the instructions to the SSP associated with the end office switch 107 which is connected to the gateway router 104. The instructions comprise one or more SS7 packets containing, among other signals, the called directory number and mailbox identity with an appropriate routing label and handling instructions, the digitized voice retrieved from the mailbox of the sender, and the identity of the originating mailbox and calling directory number. The information may be in T1 protocol which is conventionally the output digital signal of mailbox equipment used in the public switched telephone networks regardless of manufacture. Thus any translation which is necessary between the digitized message in the mailbox and the T1 or equivalent protocol used in the SS7 packets inherently occurs in the equipment furnished by the voice mail system manufacturer.

Upon receiving the foregoing SS7 message the Internet end office 107 establishes a connection to the gateway router 104. The gateway router in turn accesses the Internet address database 112 and obtains an Internet address for the destination gateway router 116 associated with the called telephone number and the voice mail system 576 which serves that telephone station in LEC 114. The destination gateway router thereupon establishes a link to the destination voice mail system and delivers the voice message.

The foregoing description of operation assumed that an address for the destination address could be secured at the sending end. However, if the existence and/or identity of a mailbox associated with the destination directory number is not subject to determination in the database of the sending end ISCP, the originating SSP 510 is instructed by its ISCP to include in the packet header appropriate directions to the remote destination SSP 512 to cause triggering and the formation and dispatch of a TCAP inquiry message to its associated ISCP. In such a case the destination ISCP conducts a dip of its database and provides the requested information to the SSP 512. The packet is thereupon processed through the SSP 512 and voice mail system 57G to digitally record the contents of the remotely originated information. Again the voice mail system is so designed as to inherently handle any translation necessary to communicate with the switching system in T1 or equivalent protocol.

When the packets reach the destination SSP 512 and the digitized voice message and accompanying instructions have been deposited in the mailbox of the addressee, the voice mail system 576 effects customary notification of the mailbox proprietor that a message is waiting. The proprietor may then access the mailbox in conventional fashion and have the message delivered as an audio voice message in the usual manner. The recipient then has the option of returning a message in a converse fashion by depressing the appropriate keys at his telephone station, which utilize the information in the packet header to reverse the origination and destination identifications. If the mailbox-to-mailbox communication feature is furnished by the involved telephone companies as an extra feature, it will be appreciated that either or both ISCPs may ascertain from their appropriate databases the authorization of the user to access the service.

As an alternative to the foregoing, instead of delivery of the message in response to action of the addressee, the message may be delivered in response to initiation by the LEC as part of a known message delivery service.

Because currently available ISCP's include billing modules they may also effect billing. The data may be sent out through the ISCP so that it can either be directed to the revenue accounting office on a direct line or it may send a TCAP message back into the SSP or end office switch to the originating number responsible for the origination of the call. Billing can be accomplished in any desired fashion, such as an bits per second, call set-up, number of packets, or any combination of the same. The billing information may go into the journal on the switch to be forwarded to the revenue accounting office.

According to another embodiment, the invention provides a system and method for transferring voice mail or messages to called parties who are not voice mail subscribers and thus do not possess individual or personal mailboxes. Pursuant to this embodiment of the invention, Voice Mail Systems 574 and 576 in the simplified network illustrated in FIG. 8 are provided with multiple unsubscribed mailboxes, which are hers described as public mailboxes or mailboxes for temporary hire. It will be understood that such mailboxes may constitute mere addresses or addressable storage or memory in the voice mail system storage. Such mailboxes may be utilized according to a first embodiment of the invention in the following fashion.

A caller at telephone station 562 connected to central office 514 makes a call to a remote called party at station 570 at central office 516. In this case the common channel signaling-system 520 determines that the call cannot be completed because of a busy or a no answer situation. The attempt to establish a voice connection between the two telephone stations is terminated and the caller is directed, as by voice prompt, to the voice mail system 574 associated with the originating central office 514. The voice processing unit associated with the voice mail system 574 informs the caller that the line is busy or that there is no answer and inquires as to whether or not the caller would like to leave a message. It also indicates that if the caller chooses to leave a message the charge will be, for example, twenty-five cents, which will be charged to his telephone bill. The Voice Processing Unit requests a yes or no response, either by voice or DTMF key or the equivalent. Where the response is affirmative, the caller is invited to leave the message in the conventional voice mail fashion and the message is stored in a public mailbox in the voice mail system 574. Appropriate messaging then occurs via the SMDI link 578 to effect billing to the caller.

Subsequent to termination of the deposit of the message as digitally stored data, the message is transferred via the Internet from the public mailbox in voice mail system 574 to a temporarily mating or corresponding public mailbox in voice mail system 576. Such transfer is effected through the Internet in the manner previously described. Following deposit or storage of the message in the destination voice mail system 576, that voice mail system initiates attempts to reach the called party or addressee at telephone station 570 to announce to that party that a message has been deposited for retrieval. The same announcement may include the instruction that the message may be retrieved by depression of a stated DTMF key. The actuation of the key may create a record constituting a receipt for the originating party. The digitally stored voice message is then delivered from the voice mail system 576 to the caller at station 570 as an audio voice message in the usual fashion. The notification of the receipt may be transferred to the billing record of the originating caller via the common channel signaling system and receipt noted with the billing for the delivery of the message.

As a still further feature of the invention, the original invitation to leave a message to the caller can include a further inquiry as to whether or not the caller requests a reply. The announcement may indicate that the delivery of the request and delivery of any reply would entail an additional charge of, for example, twenty-five cents. In the event that the caller requests a reply, the information which is transferred via the Internet pursuant to the invention includes an appropriate bit to indicate that a reply is requested. When the destination voice mail system delivers the message it responds to that bit by voicing a message that informs the recipient that a reply is requested. Instructions as to delivering a reply are provided to the called party or addressee by the destination voice mail system. The called party may then record the reply as digitized data in the local voice mail system 576.

Subsequent to termination of the connection between the destination voice mail system and the called party, the reply is transferred via the Internet back to the originating voice mail system 574 as previously described. The digitally stored reply is then delivered to the original calling party by a call from the voice mail system to the originating telephone station 564. The reply is also delivered as an audio voice message.

In the embodiment of the invention just described, the situation involved a busy or no answer condition. It is still another feature of the invention to offer the service of audio voice message delivery without an attempt to establish two-way telephone connection with the called party. Such a service may be set up using a real or virtual directory number to trigger the service. Dialing such number establishes a connection to a voice mail system local to the calling party having public or for hire mailboxes as previously described. This may be a public mailbox in the local voice mail system 574 in FIG. 8. The caller is invited to speak the message and the voice processing unit of the voice mail system may then operate its voice menu to direct the caller to depress a specified key when satisfied with the message in a known fashion. It may then query the caller as to the destination directory number. This may be followed by an inquiry to establish whether the caller requests a reply. Billing information is provided to the caller and suitable billing signaling is effected, as by use of the SMDI link 578 to the local voice mail system 574.

Following storage of the digitized voice message and digitized signaling regarding delivery and response, the digitized message is transferred via the Internet to a destination public mailbox in a voice messaging system designated by the destination ISCP on the basis of the directory number of the called party. This mailbox may be in the remote voice mail system 576 where the digitized message and instructions are stored. Delivery of the message is then effected in the same manner as previously described. Any reply is first stored in the public mailbox in voice mail system 576 and subsequently transferred through the Internet to the originating voice mailbox. The reply is then delivered to the original calling party by a telephone call to the originating telephone station.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method comprising:
   detecting an off-hook condition of a calling station;
   subsequent to detecting the off-hook condition, receiving dialed digits from the calling station, the dialed digits indicating a call request and a telephone number of a called party;
   providing a request to a routing database, the request including at least a portion of the telephone number of the called party;
   receiving in response to the request an identity of a gateway to the called party;
   sending a first signaling message over a packet-switched data network to the gateway using the identity of the gateway, the first signaling message including the telephone number of the called party and a telephone number of the calling station;
   receiving the first signaling message at the gateway;
   formulating an SS7 signaling message in response to the first signaling message, the SS7 signaling message including the telephone number of the calling station and the telephone number of the called party;
   sending the SS7 signaling message from the gateway over a connection to a public switched telephone network (PSTN) system;
   receiving at the gateway over the connection to the PSTN system an indication that the called party is at least one of busy or available;
   when the called party is indicated busy, sending a second signaling message from the gateway over the packet-switched data network indicating the called party is busy;
   when the called party is indicated available, sending a third signaling message from the gateway over the packet-switched data network indicating that the called party is available;
   recording billing information associated with the call request.

2. The method of claim 1, wherein the dialed digits include a unique identifier indicating that the call request be routed over the packet-switched data network.

3. The method of claim 1, wherein the unique identifier is one of a prefix code, an off-hook condition or a PIN number.

4. The method of claim 1, wherein the billing information is associated with the calling station.

5. The method of claim 1, wherein the billing information includes billing on at least one of a flat rate basis or a timed basis.

6. The method of claim 1, wherein the packet-switched network includes the Internet.

7. The method of claim 1, wherein the PSTN is part of a Local exchange Carrier network.

8. The method of claim 1, wherein the identity of the gateway includes an IP address of the gateway.

9. The method of claim 1, further comprising:
   subsequent to detecting the off-hook condition and prior to receiving dialed digits from the calling station, providing dial tone to the calling station.

10. The method of claim 1, further comprising:
    receiving the request at an IP address database;
    translating the at least a portion of the telephone number of the called party into an IP address of the gateway;
    providing the IP address of the gateway to the called party as the identity of the gateway.

11. A method comprising:
    detecting an off-hook condition of a calling station;
    subsequent to detecting the off-hook condition, providing dial tone to the calling station;
    receiving dialed digits from the calling station, the dialed digits indicating a call request and a telephone number of a called party;
    providing a request to a routing database, the request including the telephone number of the called party;
    receiving in response to the request an address of a called party computing device associated with the telephone number of the called party;
    sending a first signaling message over a packet-switched data network to the called party using the address of the called party computing device, the first signaling message including the telephone number of the called party and a telephone number of the calling station;
    establishing a voice communication between the calling station and the called party via the packet-switched data network;
    receiving an indication that the called party is at least one of busy or available; when the calling party is indicated busy, sending a second signaling message over the packet-switched data network indicating the called party is busy;
    when the called party is indicated available, sending a third signaling message over the packet-switched network indicating the called party is available.

12. The method of claim 11, further comprising:
    recording billing information associated with the call request.

13. The method of claim 12, wherein the billing information is associated with the calling station.

14. The method of claim 12, wherein the billing information includes billing on at least one of a flat rate basis or a timed basis.

15. The method of claim 11, wherein the dialed digits include a unique identifier indicating that the call request be routed over the packet-switched data network.

16. The method of claim 15, wherein the unique identifier is one of a prefix code, an off-hook condition or a PIN number.

17. The method of claim 11, wherein the packet-switched network includes the Internet.

18. The method of claim 11, wherein the address of the called party computing device includes an IP address.

19. The method of claim 11, wherein the routing database includes a Domain Name System (DNS) service.

20. The method of claim 11, further comprising:
    receiving the request at the routing database;
    translating the at least a portion of the telephone number of the called party into an IP address of the called party computing device;
    providing the IP address of the called party computing device as the address of the called party computing device.

21. The method of claim 1, further comprising:
    establishing a voice communication between the calling station and the called party via the packet-switched data network.

* * * * *